(12) United States Patent
Boyd et al.

(10) Patent No.: US 10,352,019 B2
(45) Date of Patent: Jul. 16, 2019

(54) FRONT LOADER AND WORK MACHINE

(71) Applicant: KUBOTA CORPORATION, Osaka (JP)

(72) Inventors: Robert Stewart Boyd, Jefferson, GA (US); Daniel Underwood, Jefferson, GA (US); Carlos Cabrera, Jefferson, GA (US)

(73) Assignee: KUBOTA CORPORATION, Osaka (JP)

( * ) Notice: Subject to any disclaimer, the term of this patent is extended or adjusted under 35 U.S.C. 154(b) by 98 days.

(21) Appl. No.: 15/604,874

(22) Filed: May 25, 2017

(65) Prior Publication Data
US 2018/0340313 A1    Nov. 29, 2018

(51) Int. Cl.
*E02F 9/22* (2006.01)
*E02F 3/34* (2006.01)
*E02F 3/43* (2006.01)
*E02F 3/627* (2006.01)

(52) U.S. Cl.
CPC .......... *E02F 3/3408* (2013.01); *E02F 3/3417* (2013.01); *E02F 3/432* (2013.01); *E02F 3/6273* (2013.01); *E02F 9/2203* (2013.01); *B60Y 2200/415* (2013.01)

(58) Field of Classification Search
CPC ......... E02F 3/308; E02F 3/401; E02F 9/2271; E02F 9/2267; E02F 9/0875
USPC ........................................ 414/707, 700, 697
See application file for complete search history.

(56) References Cited

U.S. PATENT DOCUMENTS 3,592,107 A * 7/1971 Ahlenius ................. E02F 3/433
414/697

FOREIGN PATENT DOCUMENTS

JP              5114132        1/2013

* cited by examiner

*Primary Examiner* — Michael Leslie
*Assistant Examiner* — Daniels S Collins
(74) *Attorney, Agent, or Firm* — Greenblum & Bernstein, P.L.C.

(57) ABSTRACT

A front loader includes a boom, a first pivotal shaft disposed on a tip portion of the boom, a bucket supported by the first pivotal shaft to be capable of performing a shoveling movement and a dumping movement, a boom cylinder to swing the boom, a bucket cylinder to move the bucket to make the bucket perform the shoveling movement and the dumping movement, a control valve to be switched to any one of a first state supplying an operation fluid to the bucket cylinder and a second state stopping supplying the operation fluid to the bucket cylinder, a first movable member to turn around the first pivotal shaft in accordance with the movement of the bucket, and a wire connecting the first movable member to the control valve.

19 Claims, 23 Drawing Sheets

FRONT LOADER AND WORK MACHINE

BACKGROUND OF THE INVENTION

Field of the Invention

The present invention relates to a front loader and to a work machine having the front loader.

Discussion of the Background

Japanese Patent Publication No. 5114132 discloses a front loader that is commonly known.

The front loader disclosed in Japanese Patent Publication No. 5114132 includes a boom pivotally supported by a front portion of a work machine (a tractor), a bucket pivotally supported by a tip end portion of the boom, a synchronization portion configured to move in synchronization with a shoveling movement and a dumping movement of the bucket, a bell crank supported turnably around a support shaft of the boom, and a mechanism configured to hold an attitude of the bucket such that contents in the bucket is prevented from falling down from the bucket in upward and downward movements of the boom. The mechanism has a plurality of linkage members each extending along the boom, the linkage members connecting the synchronization portion to the bell crank.

SUMMARY OF THE INVENTION

The front loader mentioned above includes the mechanism configured to hold the attitude of the bucket, the mechanism having the plurality of linkage members extending along the boom. Thus, the linkage members interfere with a front view of an operator operating the front loader in a work using the front loader.

In consideration of the interference mentioned above, the present invention intends to provide a front loader that has a mechanism configured to hold an attitude of a bucket and prevents the mechanism from interfering with a front view of an operator operating the front loader, and intends to provide a work machine having the front loader.

The present invention employs the following technical configurations, and thus achieves the purpose mentioned above.

A front loader according to an embodiment of the present invention includes a boom, a first pivotal shaft disposed on a tip portion of the boom, a bucket supported by the first pivotal shaft to be capable of performing a shoveling movement and a dumping movement, a boom cylinder to swing the boom, a bucket cylinder to move the bucket to make the bucket perform the shoveling movement and the dumping movement, a control valve to be switched to any one of a first state supplying an operation fluid to the bucket cylinder and a second state stopping supplying the operation fluid to the bucket cylinder, a first movable member to turn around the first pivotal shaft in accordance with the movement of the bucket, and a wire connecting the first movable member to the control valve.

A front loader according to another embodiment of the present invention includes a boom, a first pivotal shaft disposed on a tip portion of the boom, a bucket supported by the first pivotal shaft to be capable of performing a shoveling movement and a dumping movement, a boom cylinder to swing the boom, a bucket cylinder to move the bucket to make the bucket perform the shoveling movement and the dumping movement, a control valve to be switched to any one of a first state supplying an operation fluid to the bucket cylinder and a second state stopping supplying the operation fluid to the bucket cylinder, a first movable member to turn around the first pivotal shaft in accordance with the movement of the bucket, a second movable member connected to the control valve and configured to move to one direction and to the other direction to switch the control valve to the first state and to the second state, and a wire connecting the first movable member to the second movable member.

In embodiments, the wire can switch the control valve from the first state to the second state in accordance with an upward movement of the boom and switches the control valve from the second state to the first state in accordance with a downward movement of the boom.

In embodiments, the wire can move the second movable member to the one direction in accordance with an upward movement of the boom and moves the second movable member to the other direction in accordance with a downward movement of the boom.

In embodiments, the wire can be arranged passing under the boom.

In embodiments, the boom can include an upper plate, a lower plate, a first side plate connecting the upper plate to the lower plate, and a second side plate connecting the upper plate to the lower plate, and the wire is arranged passing between the boom cylinder and the lower plate.

In embodiments, the first movable member can include a turn member to turn around the first pivotal shaft, and an extension member extending along the boom and having one end connected to the turn member and the other end connected to the wire.

In embodiments, the front loader can include a connection member disposed on one end portion of the wire, wherein the connection member includes a pivotally-supporting portion pivotally supported by the first movable member to be turnable around the first movable member.

In embodiments, the front loader can include a support member fixed to the tip portion of the boom and supporting one end portion of the wire to move the one end portion in a longitudinal direction of the wire.

In embodiments, the second movable member can include a linkage member being turnable, a pin fixed to the linkage member and having a hole into which the other end portion of the wire is inserted, and a connection portion fixed to the linkage member and connected to the control valve.

In embodiments, the front loader can include a cover covering one end portion of the wire.

A work machine according to an embodiment of the present invention includes the front loader mentioned above and a vehicle body supporting the front loader.

The front loader and the work machine mentioned above have a mechanism configured to hold an attitude of a bucket and prevent the mechanism from interfering with a front view of an operator operating the front loader.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
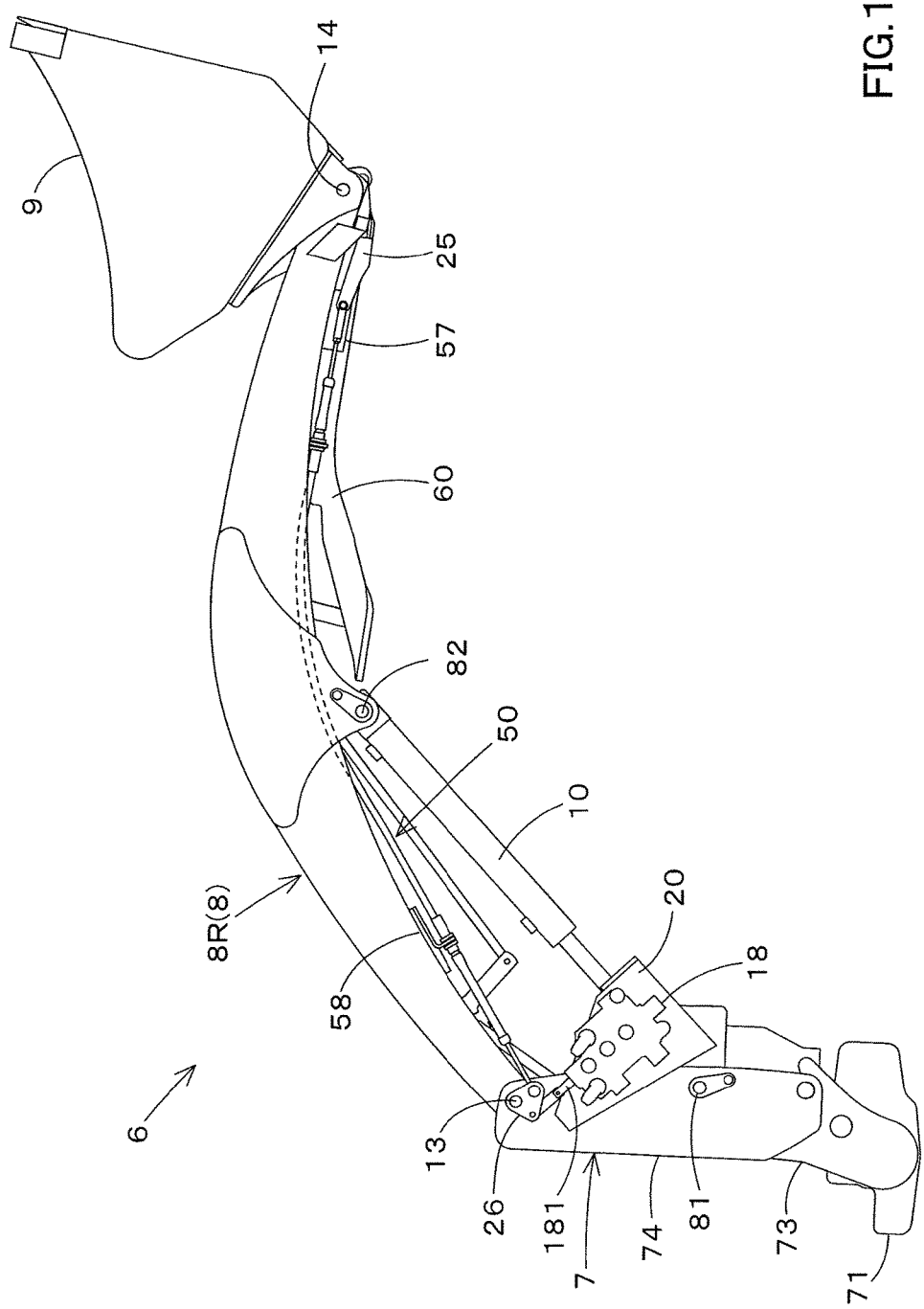
FIG. 1 is a side view of a front loader according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Referring to drawings, embodiments of the present invention will be described below.

<Work Machine>

Figure 23:
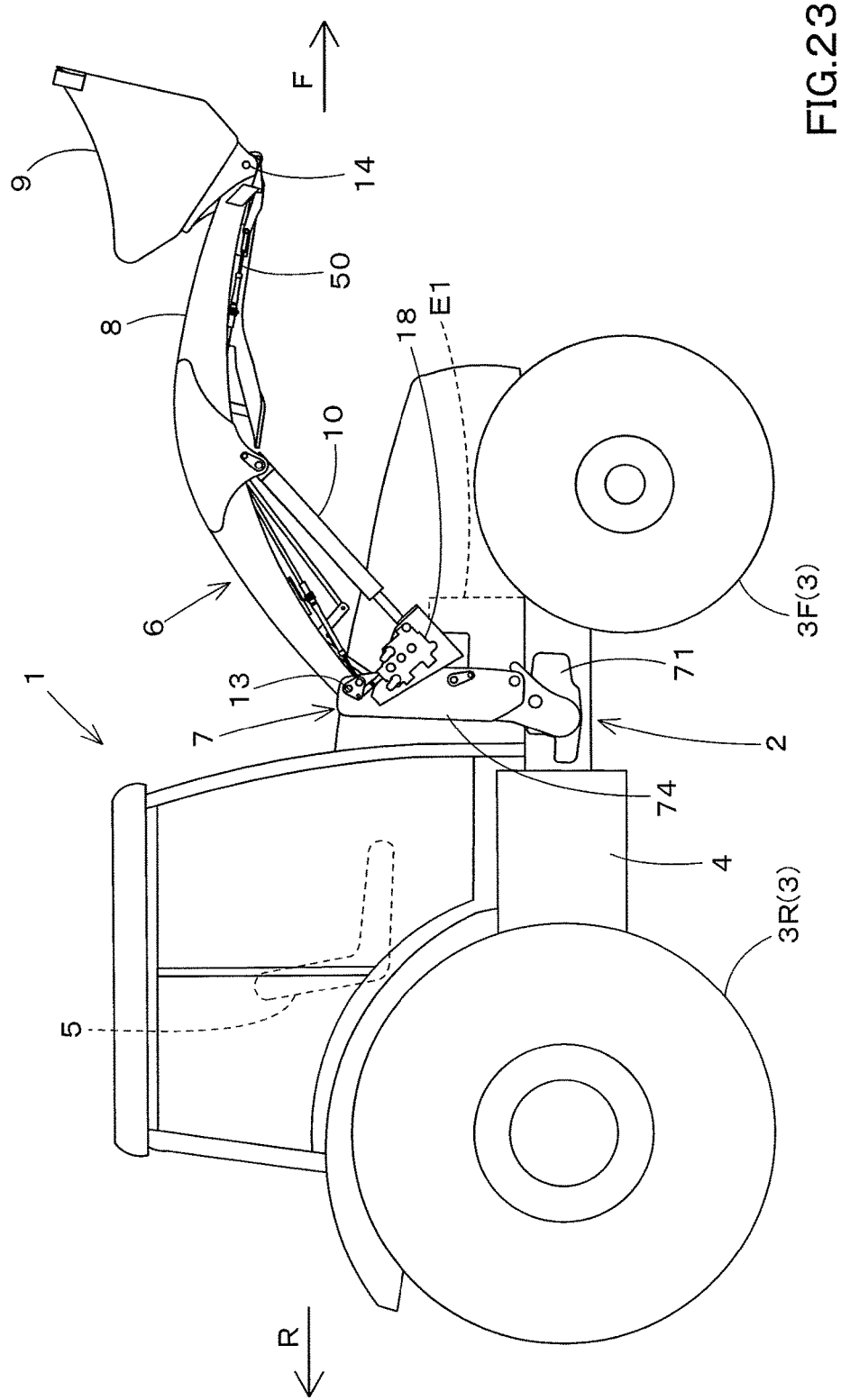
FIG. 23 is a side view of a work machine according to the first embodiment.

FIG. 23 shows a side view of a work machine 1 according to an embodiment (a first embodiment) of the present invention. In the embodiment, the work machine 1 is a tractor. However, the wok machine 1 is not limited to the tractor, and may be another kind of work machine (a work vehicle).

In explanations of the embodiment of the present invention, a forward direction (a direction shown by an arrowed line F in FIG. 23) corresponds to a front side of an operator seating on an operator seat 5 of the tractor (the work machine) 1, a backward direction (a direction shown by an arrowed line R in FIG. 23) corresponds to a back side of the operator, a leftward direction (a direction vertically extending from a front surface to a back surface of FIG. 23) corresponds to a left side of the operator, and a rightward direction (a direction vertically extending from the back surface to the front surface of FIG. 23) corresponds to a right side of the operator. In addition, a direction called a machine width direction corresponds to a horizontal direction (a depth direction of FIG. 23) that is a direction perpendicular to the forward direction and to the backward direction. And, a direction called a machine outward direction corresponds to a direction extending toward the rightward direction from a center portion of the work machine 1 and corresponds to a direction extending toward the leftward direction from a center portion of the work machine 1. In other words, the machine outward direction is equivalent to the machine width direction and is a direction stepping away from (separating from) a center of the machine width direction. A direction opposite to the machine outward direction is referred to as a machine inward direction. In other words, the machine inward direction is equivalent to the machine width direction and is a direction stepping up to (being closed to) the center of the machine width direction.

The tractor 1 includes a vehicle body 2 and a travel device 3.

The operator seat 5 is disposed on an upper portion of the vehicle body 2. An engine E1 is mounted on a front portion of the vehicle body 2. A clutch housing, a transmission case 4, and the like are disposed on a rear portion of the vehicle body 2. The travel device 3 includes a front wheel 3F and a rear wheel 3R. The front wheel 3F is disposed on a front portion of the vehicle body 2. The rear wheel 3R is disposed on a rear portion of the vehicle body 2.

A front loader 6 is attached to the vehicle body 2. The front loader 6 is supported by the front portion of the vehicle body 2. The front loader 6 will be explained below.

<Front Loader>

Figure 2:
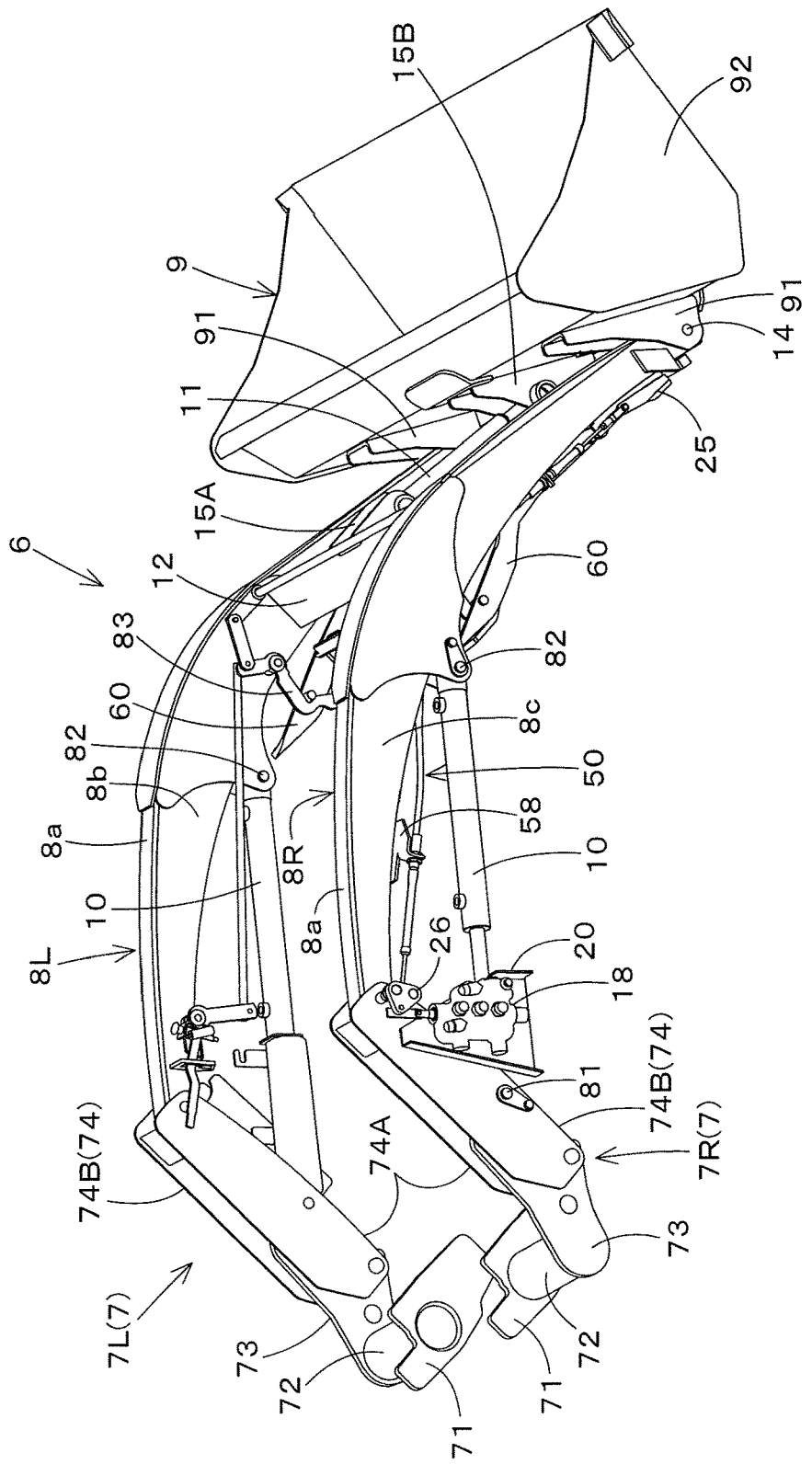
FIG. 2 is a perspective view of the front loader according to the first embodiment.
Figure 3:
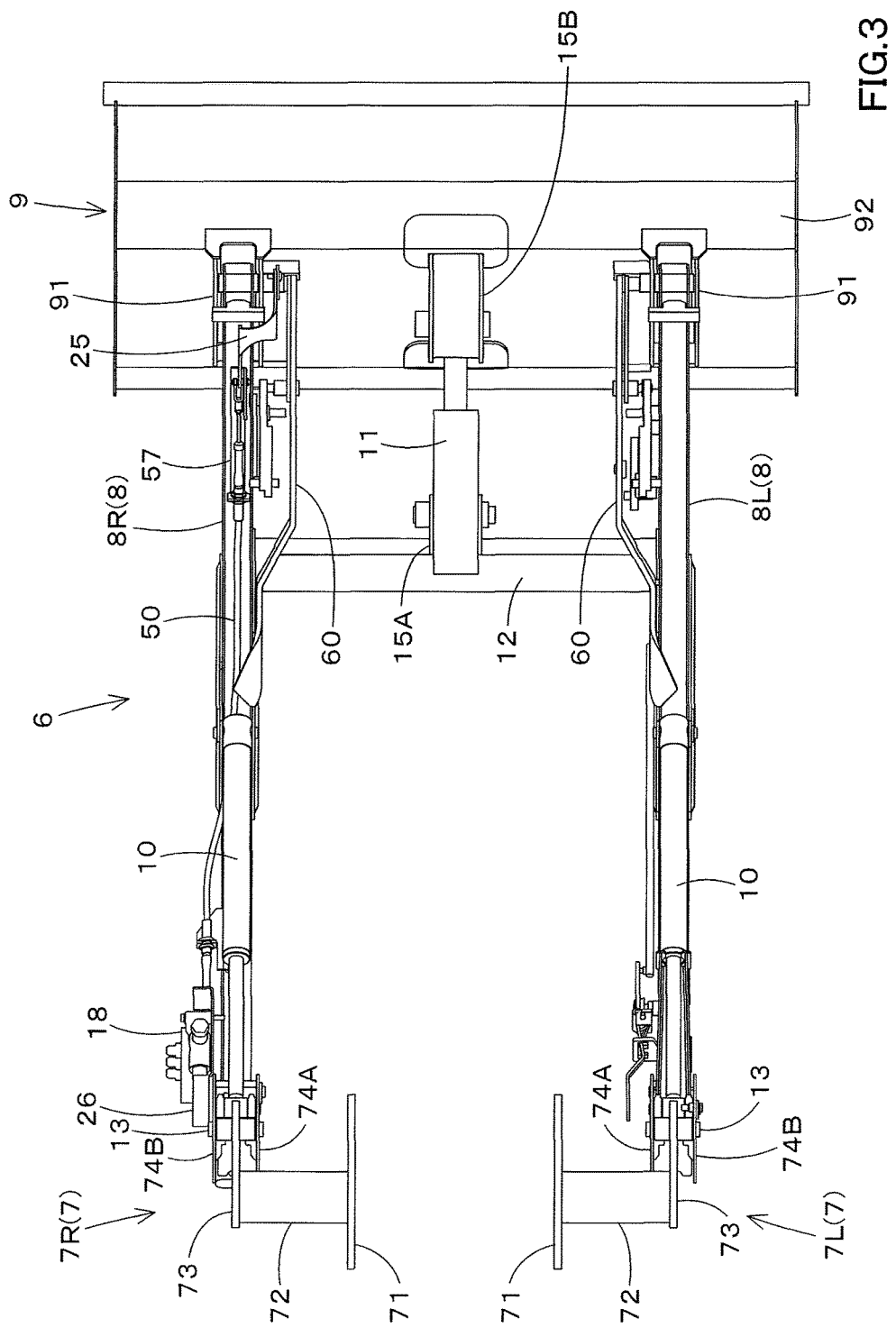
FIG. 3 is a bottom view of the front loader according to the first embodiment.

As shown in FIG. 1 to FIG. 3, the front loader 6 includes an attachment frame 7, a boom 8, a bucket 9, a boom cylinder 10, and a bucket cylinder 11.

The attachment frame 7 includes a left frame 7L and a right frame 7R. Each of the attachment frames 7 (the left frame 7L and the right frame 7R) includes an attachment plate 71, a support body 72, a main frame 73, and a side frame 74.

The attachment plate 71 is capable of being attached to a left side of the vehicle body 2, and another attachment plate 71 is also capable of being attached to a right side of the vehicle body 2. The attachment plate 71 of the left frame 7L is capable of being attached to the left side of the vehicle body 2. The attachment plate 71 of the right frame 7R is capable of being attached to the right side of the vehicle body 2. The support body 72 protrudes from the attachment plates 71 toward the machine outward direction, the attachment plates 71 being attached to the left side and the right side.

The main frame 73 is disposed extending from an end portion of the support body 72 in the machine outward direction, the support body 72 being disposed to the left, and another main frame 73 is disposed extending from an end portion of the support body 72 in the machine outward direction, the support body 72 being disposed to the right.

The side frame 74 is attached to the main frame 73, and is detachable from the main frame 73. The side frame 74 extends upward from the main frame 73. The side frame 74 includes an inner side frame 74A and an outer side frame 74B.

The inner side frame 74A is arranged on an inner side in the machine inward direction. The outer side frame 74B is arranged on an outer side in the machine outward direction. The inner side frame 74A is arranged on an inner side in the machine inward direction. A pivotal shaft 13 is disposed on an upper portion of the side frame 74, the pivotal shaft 13 extending in the machine width direction.

The pivotal shaft 13 penetrates the inner side frame 74A and the outer side frame 74B, the pivotal shaft 13 extending in the machine width direction.

As shown in FIG. 2 and FIG. 3, the boom 8 includes a left boom 8L and a right boom 8R. The left boom 8L is supported by the left frame 7L. The right boom 8R is supported by the right frame 7R. A connection member 12 connects an intermediate portion of the left boom 8L to an intermediate portion of the right boom 8R.

A base end portion of the boom 8 (the left boom 8L, the right boom 8R) is supported by the pivotal shaft 13 disposed on the attachment frame 7 (the side frame 74), and thus the boom 8 is capable of being swung around the pivotal shaft 13. A pivotal shaft 14 is disposed on a tip end portion of the boom 8, the pivotal shaft 14 extending in the machine width direction.

For convenience of the explanation, the pivotal shaft 14 will be referred to as "the first pivotal shaft 14", and the pivotal shaft 13 will be referred to as "the second pivotal shaft 13". In addition, "a boom length direction" corresponds to a direction of extension of the boom 8. "A boom forward direction" corresponds to a direction extending from the base end of the boom 8 to the tip end of the boom 8. "A boom backward direction" corresponds to a direction extending from the tip end of the boom 8 to the base end of the boom 8.

Figure 4:
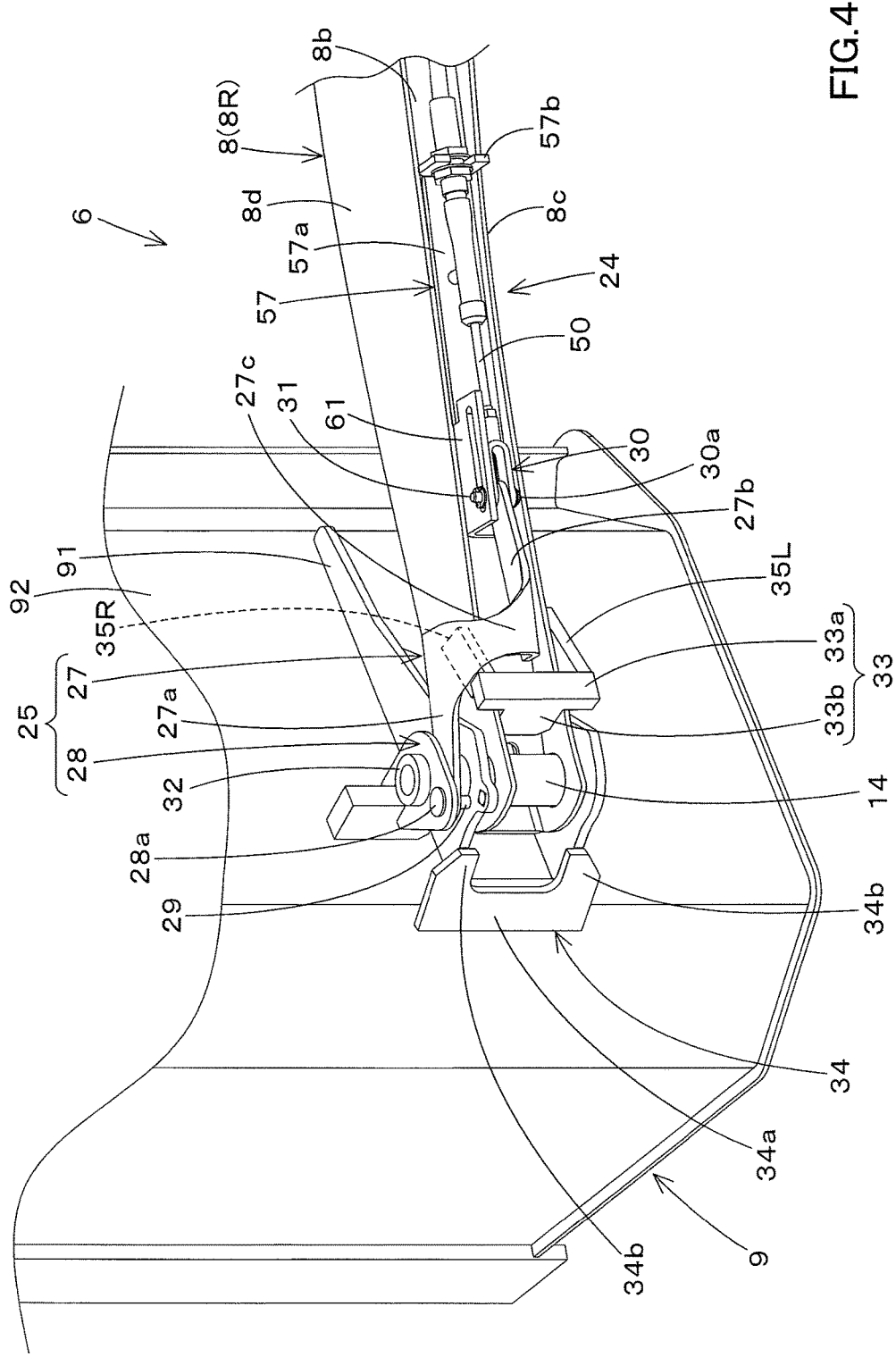
FIG. 4 is a perspective view of a tip portion of a boom included in the front loader according to the first embodiment.

The boom 8 is formed to have a substantially-squared cylindrical shape in the embodiment. As shown in FIG. 2 and FIG. 4, the boom 8 includes an upper plate 8a, a lower plate 8b, a first side plate 8c, and a second side plate 8d. The upper plate 8a is disposed on an upper portion of the boom 8. The lower plate 8b is disposed on a lower portion of the boom 8, and is opposed to the upper plate 8a.

The first side plate 8c is disposed on an outer side in the machine outward direction, and connects an outer side of the upper plate 8a to an outer side of the lower plate 8b in the machine outward direction. The second side plate 8d is disposed on an inner side in the machine outward direction, and connects an inner side of the upper plate 8a to an inner side of the lower plate 8b in the machine inward direction.

As shown in FIG. 4, a lower portion of the first side plate 8c and a lower portion of the second side plate 8d protrude downward from a lower surface of the lower plate 8b. The shape of the boom 8 is not limited to the substantially-squared cylindrical shape, and thus may be another shape.

Figure 5:
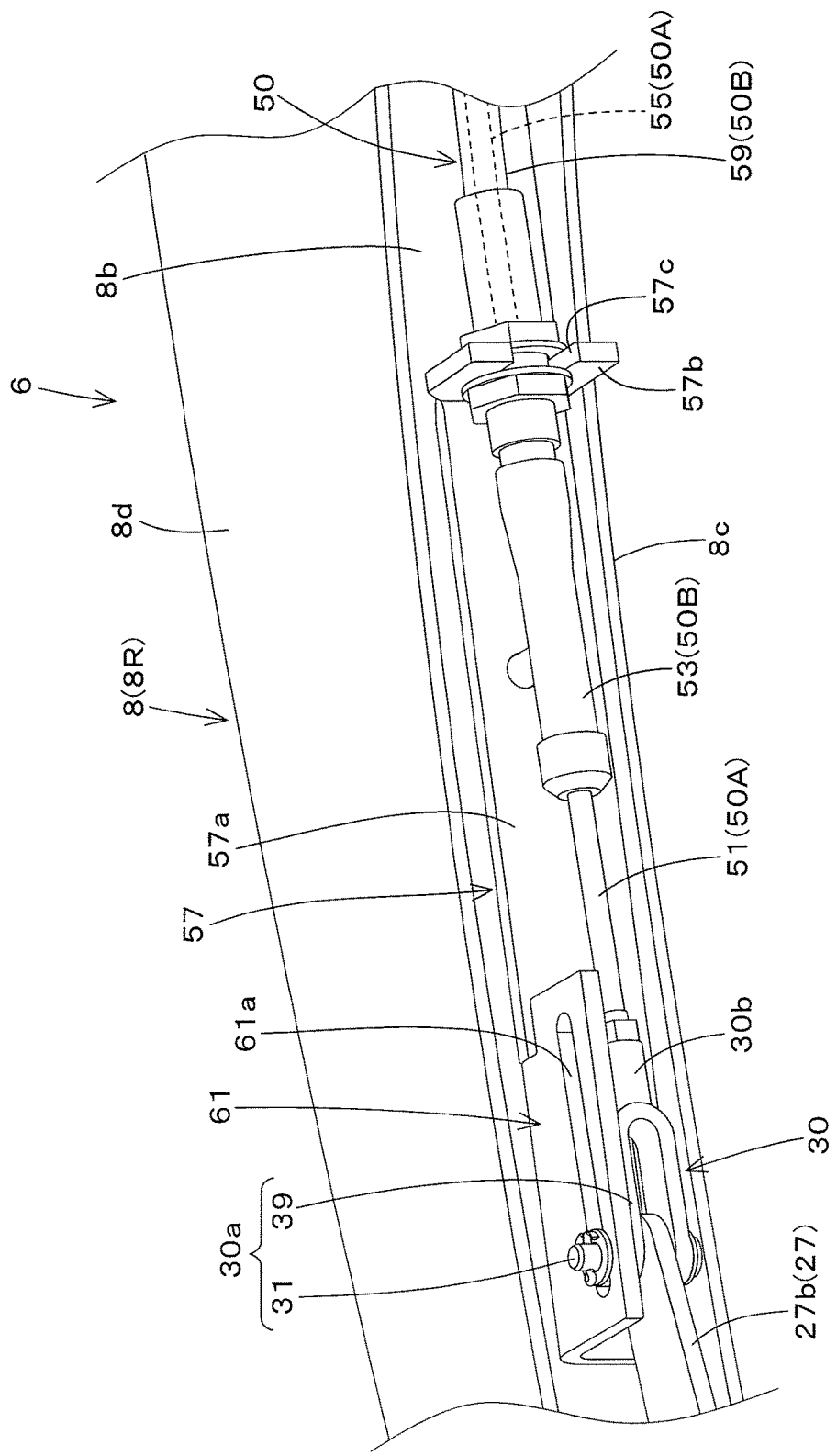
FIG. 5 is a view illustrating an enlarged part of FIG. 4 according to the first embodiment.
Figure 7:
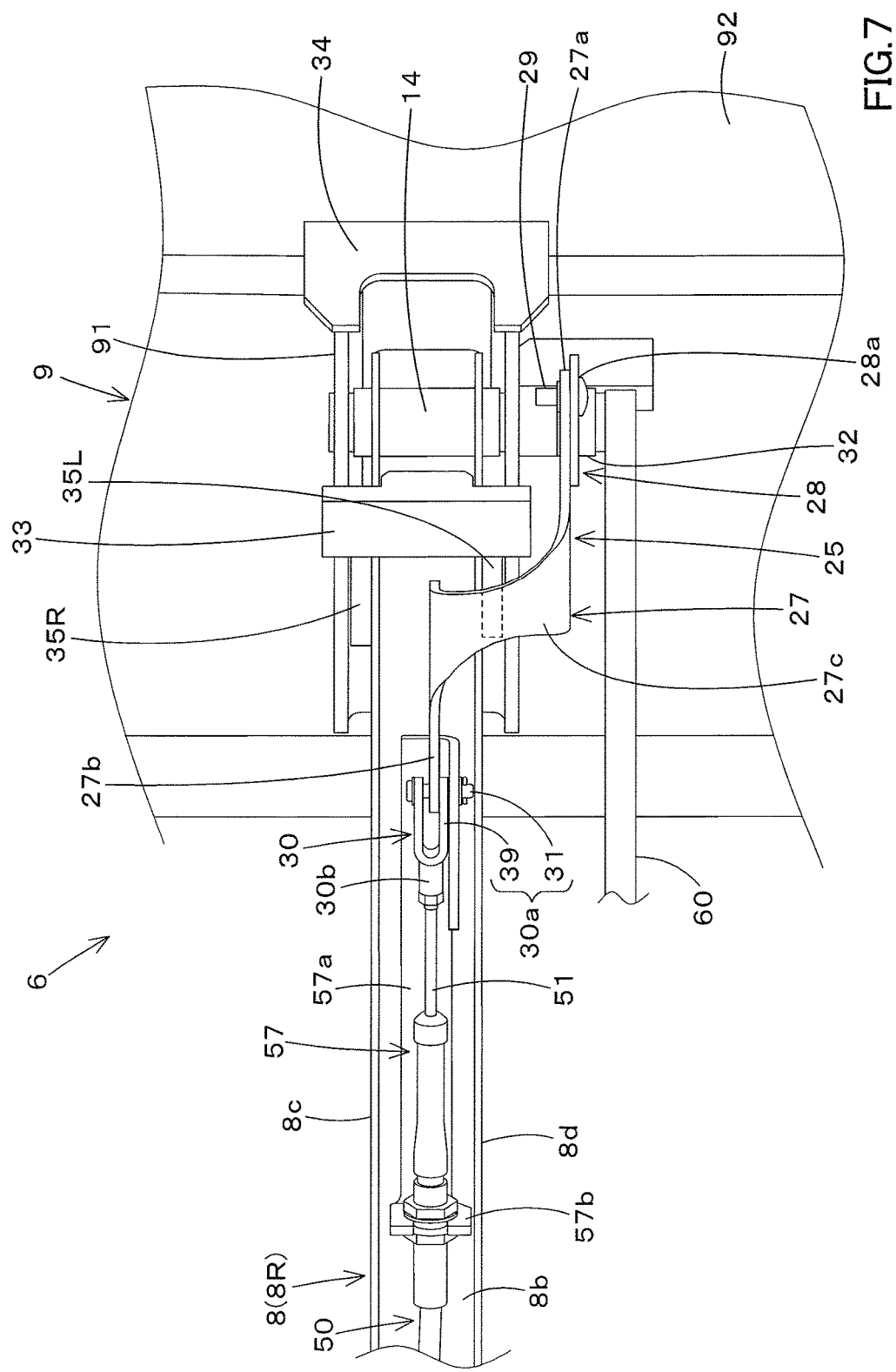
FIG. 7 is a view illustrating an enlarged part of FIG. 6 according to the first embodiment.

As shown in FIG. 4, FIG. 5, and FIG. 7, a stopper 33 and connectors 35L and 35R are disposed on a tip end portion of the boom 8. The left boom 8L is provided with the stopper 33 and the connectors 35L and 35R. The right boom 8R is also provided with the stopper 33 and the connectors 35L and 35R.

Figure 6:
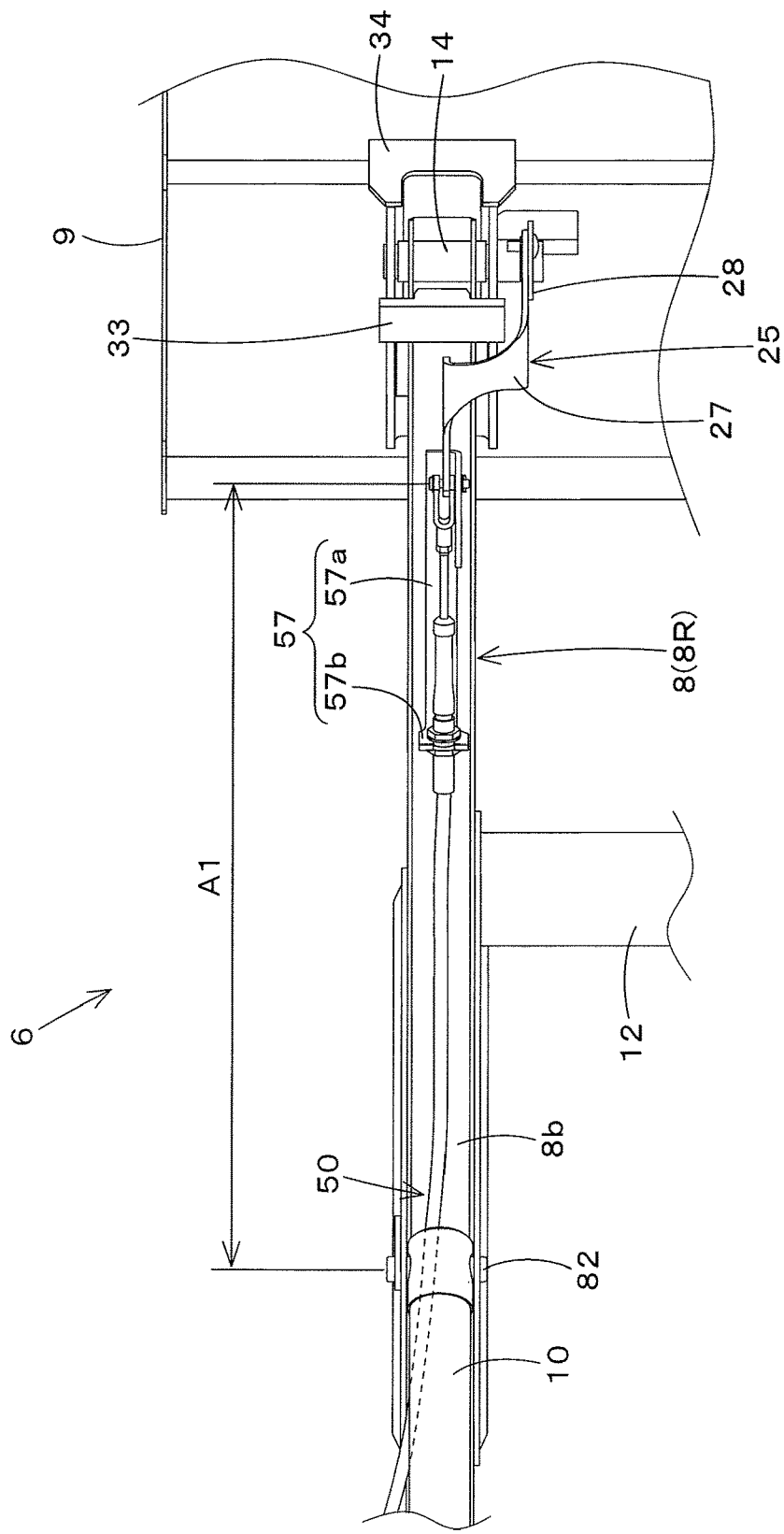
FIG. 6 is a bottom view of the tip portion of the boom included in the front loader according to the first embodiment.

As shown in FIG. 4, FIG. 6, and the like, the stopper 33 is disposed behind the first pivotal shaft 14 in the boom backward direction. As shown in FIG. 4, the stopper 33 includes a lateral portion 33a and a vertical portion 33b, and thus is formed to have a T-shape as a whole.

The lateral portion 33a is disposed extending from a portion under the first side plate 8c to another portion under the second side plate 8d in the machine width direction. The vertical portion 33b is disposed extending from a center of the lateral portion 33a in the machine width direction to the lower plate 8b.

The stopper 33 touches a stopper plate 34 described below, and thus restricts an angle of swinging of the bucket 9 with respect to the boom 8.

As shown in FIG. 4, the connector 35L connects the first side plate 8c of the boom 8 to a left portion of the lateral portion 33a of the stopper 33. As shown in FIG. 4 and FIG. 7, the connector 35R connects the second side plate 8d of the boom 8 to a right portion of the lateral portion 33a of the stopper 33. In this manner, the stopper 33 is fixed to the boom 8 by the connectors 35L and 35R.

As shown in FIG. 1, FIG. 3 and FIG. 6, a first bracket 57 is disposed on the tip end portion of the boom 8. The first bracket 57 is disposed on either one of the left boom 8L and the right boom 8R (on the right boom 8R in the embodiment).

As shown in FIG. 7, the first bracket 57 is arranged behind the stopper 33 and the connectors 35L and 35R. As shown in FIG. 4 to FIG. 7, the first bracket 57 includes a first fixing portion 57a and a first supporting portion 57b.

The first fixing portion 57a has a square plate shape, and is fixed to the lower surface of the lower plate 8b of the boom 8.

The first supporting portion 57b extends and is bent downward from a rear edge of the first fixing portion 57a. The first supporting portion 57b has a plate shape. One of the surfaces of the plate faces the boom forward direction, and the other one of the surfaces faces the boom backward direction. The first supporting portion 57b includes a notch 57c formed by cutting the first supporting portion 57b upward from the lower edge. The first supporting portion 57b supports a tip end portion of a wire 50 described below.

Figure 8:
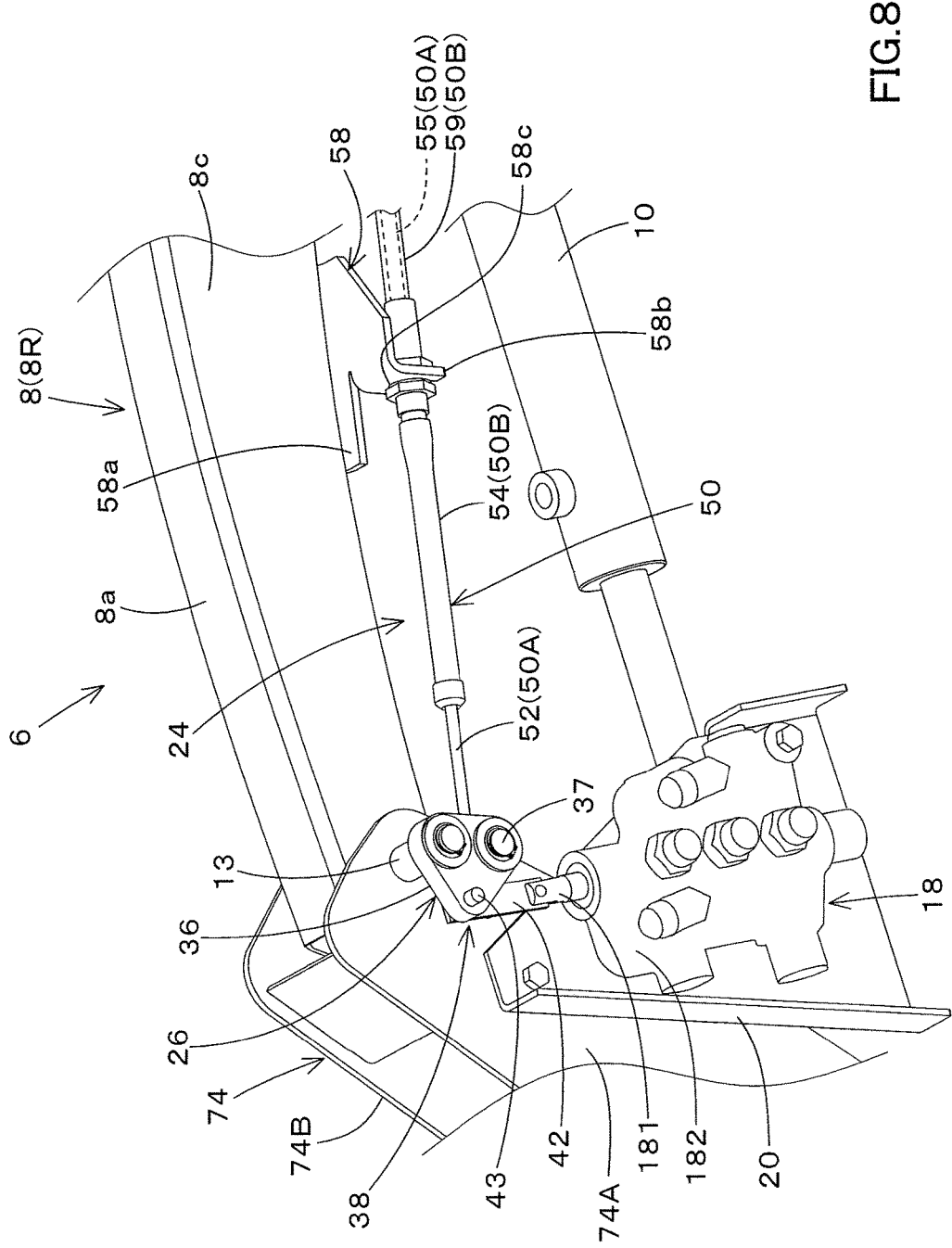
FIG. 8 is a perspective view of a base portion of the boom included in the front loader according to the first embodiment.

As shown in FIG. 1, FIG. 2 and FIG. 8, a second bracket 58 is disposed on the base end portion of the boom 8. The second bracket 58 is disposed on the boom 8 (on the right boom 8R in the embodiment) on which the first bracket 57 is disposed.

As shown in FIG. 8, the second bracket 58 includes a second fixing portion 58a and a second supporting portion 58b. The second fixing portion 58a has a square plate shape, and is fixed to the lower surface of the lower plate 8b of the boom 8.

The second supporting portion 58b is positioned to be more outward than the boom 8 in the machine outward direction (positioned to be more rightward than the first side plate 8c), the second supporting portion 58b extending and being bent downward. The second supporting portion 58b has a plate shape. One of the surfaces of the plate faces the boom forward direction, and the other one of the surfaces faces the boom backward direction.

The second supporting portion 58b includes a notch 58c formed by cutting the second supporting portion 58b upward from the lower edge. The second supporting portion 58b supports a base end portion of the wire 50 described below.

As shown in FIG. 1 to FIG. 3, the boom 8 is provided with a stand 60. The stand 60 is disposed on the left boom 8L. Another stand 60 is disposed on the right boom 8R. The stands 60 extend along the left boom 8L and the right boom 8R respectively in the boom longitudinal direction.

As shown in FIG. 3, the stands 60 are disposed on the tip end portion of the boom 8, specifically on an inner side of the left boom 8L and on an inner side of the right boom 8R in the machine outward direction. As shown in FIG. 7, one end portion (a tip end portion) of the stand 60 is pivotally supported by a lateral shaft 32. The lateral shaft 32 is arranged on an inner side of the first pivotal shaft 14 in the machine inward direction, and thus is capable of being turned about the first pivotal shaft 14.

As shown in FIG. 2, the other end portion (a base end portion) of the stand 60 is linked to a linkage portion (linkage member) 83 at an intermediate portion of the boom 8 in the boom longitudinal direction. The linkage portion 83 is disposed on the side plate of the boom 8 in the machine inward direction. The stand 60 is capable of being grounded together with the bucket 9 when the linkage at the other end portion is released to detach the front loader 6 from the tractor 1.

For convenience of illustrating the drawings, the stand 60 is not illustrated in the drawings other than FIG. 1 to FIG. 3.

As shown in FIG. 1 to FIG. 3, the boom cylinder 10 connects the side frame 74 to the boom 8.

One end portion (a base end portion) of the boom cylinder 10 is attached to the side frame 74. In particular, the one end portion of the boom cylinder 10 is pivotally supported by a lateral shaft 81 at an intermediate portion of the side frame in the vertical direction, and thus is capable of being turned about the lateral shaft 81.

The other end portion (a tip end portion) of the boom cylinder 10 is attached to the boom 8. In particular, the other end portion of the boom cylinder 10 is pivotally supported by a lateral shaft 82 at an intermediate portion of the boom 8 in a front-to-rear direction (a longitudinal direction of the boom 8), and thus is capable of being turned about the lateral shaft 82.

The boom 8 swings upward around the second pivot shaft 13 when the boom cylinder 10 is stretched, and the boom 8 swings downward around the second pivot shaft 13 when the boom cylinder 10 is shortened.

A boom control valve 19 described below (refer to FIG. 9) controls the boom cylinder 10. The boom control valve 16 is disposed on the tractor 1. The boom control valve 16 is operated by an operation tool such as an operation lever that is manually handled.

As shown in FIG. 2 to FIG. 4, the bucket 9 has a bucket bracket 91 and a bucket body 92. The bucket bracket 91 is supported by the first pivot shaft 14, and thus is capable of swinging about the first pivot shaft 14.

The bucket body 92 is a member (a portion) for shoveling (holding) the earth and sand. The bucket body is attached to a front portion of the bucket bracket 91. The bucket bracket 91 and the bucket body 92 integrally turn about the first pivot shaft 14.

As shown in FIG. 4 and FIG. 7, the lateral shaft 32 is fixed to an inner surface (a right surface) of the bucket bracket 91 in the machine inward direction. The lateral shaft 32 extends in the machine width direction. A center axis of the lateral shaft 32 extends on an identical straight line on which a center axis of the first pivotal shaft 14 (that is, being coaxial). The center axis of the lateral shaft 32 is arranged to be more inward than the first pivotal shaft 14 in the machine inward direction.

A turn member 28 is fixed to an outer circumferential surface of the lateral shaft 32, the turn member 28 constituting a first movable member 25. The first movable member 25 will be described later. The turn member 28 turns about the first pivotal shaft 14 together with the lateral shaft 32 and the bucket bracket 91.

As shown in FIG. 4, FIG. 6 and FIG. 7, the stopper plate 34 is disposed in front of the bucket bracket 91. The stopper plate 34 is fixed to a bottom surface of the bucket body 92.

As shown in FIG. 4, the stopper plate 34 includes a base portion 34a and protruding portions 34b. The base portions 34a extend in the machine width direction. The protruding portions 34b extend respectively protruding downward from one side of the base portion 34a and from the other side of the base portion 34a in the machine width direction (in a direction stepping away from (separating from) a bottom surface of the bucket body 92).

When the bucket 9 swings forward around the first pivotal shaft 14 (performs a dumping movement), the protruding portions 34b of the stopper plate 34 touch the lateral portion 33a of the stopper 33. In this manner, an angle of swinging of the bucket 9 is restricted with respect to the boom 8.

As shown in FIG. 2 and FIG. 3, a cylinder bracket 15A is disposed on an intermediate portion of the connection member 12 in the machine width direction. A cylinder bracket 15B is disposed on a middle of a lower portion of a rear surface of the bucket 9 in the machine width direction.

One end portion (a base end portion) of the bucket cylinder 11 is attached to the cylinder bracket 15A. The other end portion (a tip end portion) of the bucket cylinder 11 is attached to the cylinder bracket 15B.

The bucket 9 performs a shoveling movement around the first pivot shaft 14 when the bucket cylinder 11 is stretched, and the bucket 9 performs a dumping movement around the first pivot shaft 14 when the bucket cylinder 11 is shortened.

A bucket control valve 17 described below (refer to FIG. 9) controls the bucket cylinder 11. The bucket control valve 17 is disposed on the tractor 1. The bucket control valve 17 is operated by an operation tool such as an operation lever that is manually handled.

As shown in FIG. 1 to FIG. 3 and FIG. 8, a control valve 18 is attached to the side frame 74. The control valve 18 is attached to the side frame 74 by a valve bracket 20. The control valve 18 is attached to the side frame 74 that is attached to the boom 8 (the right boom 8R in the embodiment) on which the first bracket 57 and the second bracket 58 are disposed.

The control valve 18 is attached to the side frame 74 of the right frame 7R in the embodiment. For convenience of the explanation, the control valve 18 will be referred to as "the level control valve 18" below.

<Hydraulic Circuit>

Figure 9:
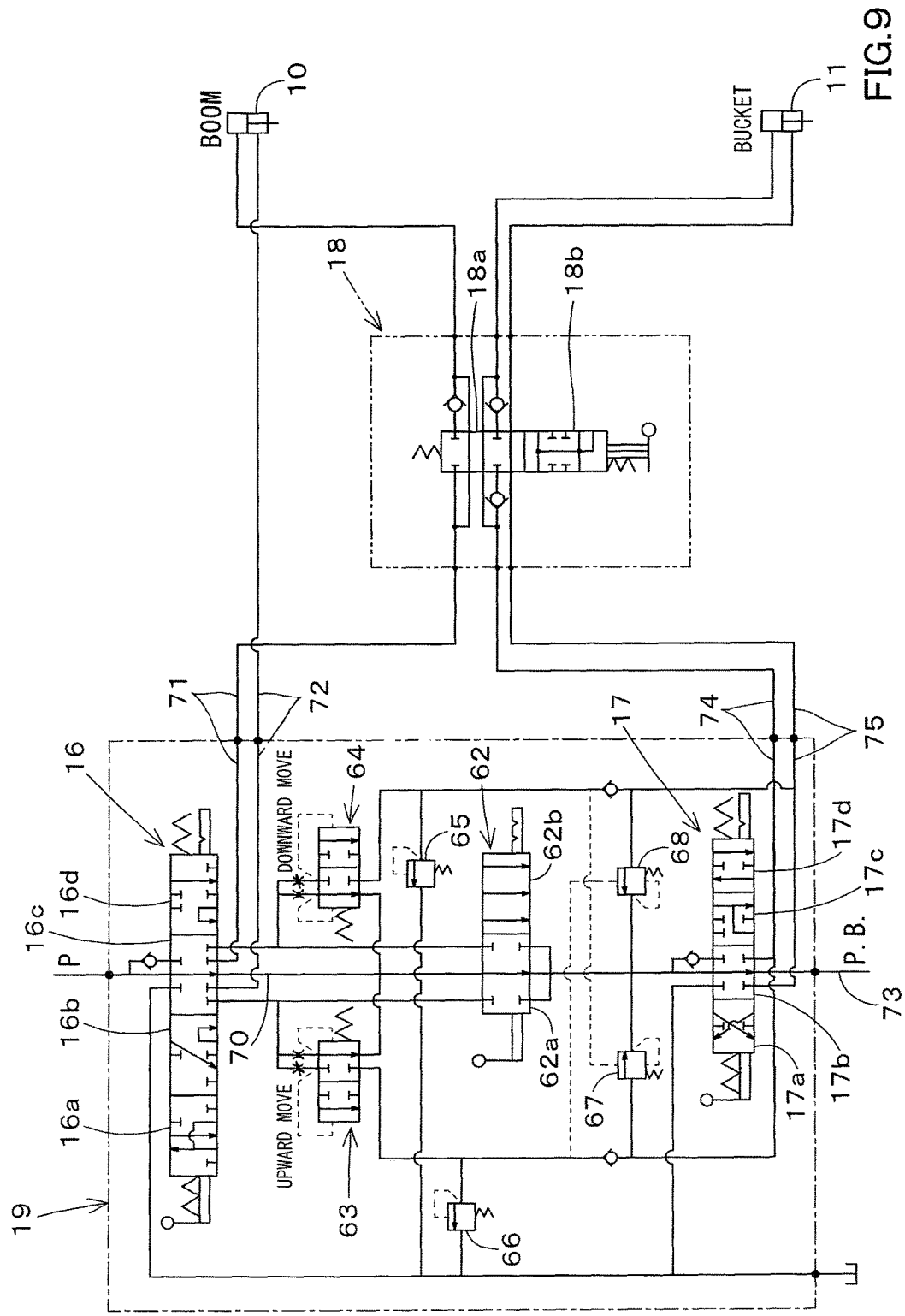
FIG. 9 is a circuit diagram of a hydraulic circuit of the front loader according to the first embodiment.

The front loader 6 has a hydraulic circuit. The hydraulic circuit is configured to control the boom cylinder 10 and the bucket cylinder 11. The hydraulic circuit controls the boom cylinder 10 and the bucket cylinder 11 in accordance with the handling of the operation lever (not shown in the drawings). As shown in FIG. 9, the hydraulic circuit includes a hydraulic control valve 19 and the level control valve 18.

<Hydraulic Control Valve>

The hydraulic control valve 19 is attached to the vehicle body 2 of the tractor 1, for example. The hydraulic control valve 19 supplies an operation fluid (an operation oil) to the boom cylinder 10 and the bucket cylinder 11 in accordance with the handling of the operation lever. In this manner, the hydraulic control valve moves the boom 8 upward and downward and makes the bucket 9 perform the shoveling movement and the dumping movement.

In addition, the hydraulic control valve 19 controls the boom cylinder 10 and the bucket cylinder 11 such that the bucket 9 performs the dumping movement in synchronization with the moving-up (the upward movement) of the boom 8 and such that the bucket 9 performs the shoveling movement in synchronization with the moving-down (the downward movement) of the boom 8, and thereby holds an attitude of the bucket 9 to be constant in the upward movement and the downward movement.

As shown in FIG. 9, the hydraulic control valve 19 includes the boom control valve 16, the bucket control valve 17, an attitude-holding switch valve 62, an upward-movement adjuster valve 63, a downward-movement adjuster valve 64, and relief valves 65, 66, 67 and 68.

The boom control valve 16 is configured to be manually operated to be switched between a floating position 16a, a downward-movement position 16b, a neutral position 16c and an upward-movement position 16d.

When the boom control valve 16 is switched to the neutral position 16c, the operation fluid is supplied to the bucket control valve 17 through a fluid tube (a fluid path) 70, the operation fluid being supplied from a pump.

When the boom control valve 16 is switched to the upward-movement position 16d, the operation fluid is supplied to a bottom side of the boom cylinder 10 through a fluid tube (a fluid path) 71, the operation fluid being supplied from the pump. Then, the operation fluid returning from the boom cylinder 10 returns to the boom control valve 16 through a fluid tube (a fluid path) 72.

When the boom control valve 16 is switched to the downward-movement position 16b, the operation fluid is supplied to a rod side of the boom cylinder 10 through the fluid tube 72, the operation fluid being supplied from the pump. Then, the operation fluid returning from the boom cylinder 10 returns to the boom control valve 16 through the fluid tube 71.

The bucket control valve 17 is configured to be manually operated to be switched between a shoveling position 61a, a neutral position 61b, a quickly-dumping position 17c and a dumping position 17d.

When the bucket control valve 17 is switched to the neutral position 17b, the operation fluid is supplied to an external fluid device through a fluid tube (a fluid path) 73, the operation fluid being supplied from the pump.

When the bucket control valve 17 is switched to the shoveling position 17a, the operation fluid is supplied to a rod side of the bucket cylinder 11 through a fluid tube (a fluid path) 75, the operation fluid being supplied from the pump. Then, the operation fluid returning from the bucket cylinder 11 returns to the bucket control valve 17 through a fluid tube (a fluid path) 74.

When the bucket control valve 17 is switched to the dumping position 17d, the operation fluid is supplied to a bottom side of the bucket cylinder 11 through the fluid tube 74, the operation fluid being supplied from the pump. Then, the operation fluid returning from the bucket cylinder 11 returns to the bucket control valve 17 through the fluid tube 75.

In addition, when the bucket control valve 17 is switched to the quickly-dumping position 17c, the operation fluid is supplied to the bottom side of the bucket cylinder 11 through the fluid tube 74, the operation fluid being supplied from the pump. Then, the operation fluid returning from the rod side of the bucket cylinder 11 is supplied to the fluid tube 74 through the fluid tube 75.

The attitude-holding switch valve 62 is configured to be manually operated to be switched between an attitude-holding activating position 62a and an attitude-holding inactivating position 62b.

When the attitude-holding switch valve 62 is switched to the attitude-holding activating position 62a with the boom control valve 16 switched to the downward-movement position 16b or the upward-movement position 16d, the operation fluid is not supplied to the bucket control valve 17 through the attitude-holding switch valve 62, the operation fluid being supplied from the pump.

In this manner, the dumping movement and the shoveling movement of the bucket 9 is disabled free from the operation of the bucket control valve 17.

In addition, when the attitude-holding switch valve 62 is switched to the attitude-holding inactivating position 62b, the operation fluid from the pump is supplied to the bucket control valve 17 through the attitude-holding switch valve 62 regardless of the switching position of the boom control valve 16.

In this manner, the dumping movement and the shoveling movement of the bucket 9 are performed due to the switching operation of the bucket control valve 17 free from the operation of the boom control valve 16.

With the boom control valve 16 switched to the upward-movement position 16d, the upward-movement adjuster valve 63 divides the operation fluid returning from the boom cylinder 10 to supply the divided operation fluid to the bottom side of the bucket cylinder 11 through the fluid tube 74.

With the boom control valve 16 switched to the downward-movement position 16b, the downward-movement adjuster valve 64 divides the operation fluid returning from the boom cylinder 10 to supply the divided operation fluid to the rod side of the bucket cylinder 11 through the fluid tube 75.

If a tilting angle of the bucket 9 exceeds a predetermined angle with respect to the horizontal surface in the shoveling movement of the bucket 9, contents such as the earth and soil in the bucket 9 falls down from (is spilt from) the bucket 9. For convenience of the explanation, a range of the tilting angle where the tilting angle of the bucket 9 does not exceed a predetermined angle with respect to the horizontal surface (a range of the tilting angle between an upper limitation and a lower limitation where the contents does not fall down) will be referred to as "a marginal range" below.

The level control valve 18 has a function that stops the shoveling movement of the bucket 9 before the tilting angle of the bucket 9 with respect to the horizontal surface reaches the marginal range (or when the tilting angle reaches the marginal range).

<Level Control Valve>

The level control valve 18 is constituted of a two-position switch valve having a direct-acting spool. As shown in FIG. 8, a spool 181 of the level control valve 18 protrudes upward from a body 182 housing the spool 181. The level control valve 18 is switched from a neutral position 18a to a control position 18b when the spool 181 is pressed downward.

When the downward pressing of the spool 181 is stopped, the spool 181 returns (is switched) from the control position 18b to the neutral position 18a due to a pressing force of a return spring.

The spool 181 in the control position 18b allows the operation fluid to be supplied to the bucket cylinder 11 (that will be referred to as "a first state" below).

The spool 181 in the neutral position 18a stops allowing the operation fluid to be supplied to the bucket cylinder 11 (that will be referred to as "a second state" below).

That is, the level control valve 18 is switched between the first state and the second state by the movement of the spool 181.

A hydraulic tube 71 extends from the boom control valve 16 to the bottom side (the upward movement side) of the boom cylinder 10. A hydraulic tube 74 extends from the bucket control valve 17 to the bottom side (the dumping movement side) of the bucket cylinder 11. The hydraulic tube 71 and the hydraulic tube 74 are arranged passing through the level control valve 18. A hydraulic tube 72 extends from the boom control valve 16 to the rod side (the downward movement side) of the boom cylinder 10. The hydraulic tube 72 is arranged without passing through the level control valve 18.

<Synchronization Mechanism>

As shown in FIG. 4 and FIG. 8, the boom 8 is provided with a synchronization mechanism 24, the synchronization mechanism 24 connecting the bucket 9 (the bucket bracket 91) to the level control valve 18. The synchronization mechanism 24 includes a first movable member 25, a second movable member 26 and a wire 50.

FIG. 4 illustrates the synchronization mechanism 24 (the first movable member 25, the wire 50) arranged on a front portion of the boom 8. FIG. 8 illustrates the synchronization mechanism 24 (the second movable member 25, the wire 50) arranged on a rear portion of the boom 8.

The synchronization mechanism 24 is disposed on the boom 8 (the right boom 8R in the embodiment) on which the first bracket 57 and the second bracket 58 are arranged.

The synchronization mechanism 24 is a mechanism mainly for holding the attitude of the bucket 4 to be horizontal in the upward movement of the boom 8. The synchronization mechanism 24 operates the level control valve 18 such that the bucket 9 performs the dumping movement in synchronization with the moving-up (the upward movement) of the boom 8 and such that the bucket 9 performs the shoveling movement in synchronization with the moving-down (the downward movement) of the boom 8.

<First Movable Member>

As shown in FIG. 1 to FIG. 3, the first movable member 25 is disposed on the tip end portion of the boom 8. The first movable member 25 moves in one direction or in the other direction in accordance with the movement (the dumping movement, the shoveling movement) of the bucket 9. As shown in FIG. 4 and FIG. 7, the first movable member 25 includes the turn member 28 and an extension member 27 in the embodiment.

The turn member 28 turns about the first pivotal shaft 14. The turn member 28 includes a pivotally-supporting member 28a (hereinafter referred to as "a first pivotally-supporting member 28a") that pivotally supports the extension member 27. The first pivotally-supporting member 28a includes a shaft body 29 (hereinafter referred to as "a first shaft body 29") that penetrates the turn member 28 in the machine width direction.

The extension member 27 is disposed extending along the boom 8. One end (a tip end) of the extension member 27 is connected to the turn member 28. The other end of the extension member 27 is connected to the wire 50.

The extension member 27 includes a first attachment portion 27a, a second attachment portion 27b and an intermediate portion 27c. In the embodiment, the first attachment portion 27a, the second attachment portion 27b and the intermediate portion 27c are integrally constituted of a piece of plate (a metal plate and the like) that is bent to form the portions.

As shown in FIG. 4 and FIG. 7, the first attachment portion 27a is arranged on an inner side of the first side plate 8a of the boom 8 in the machine inward direction. The first attachment portion 27a extends in the longitudinal direction of the boom 8. The tip end portion of the first attachment portion 27a is arranged between the bucket bracket 91 and the turn member 28 in the machine width direction.

A front end portion of the first attachment portion 27a is pivotally supported by the turn member 28, that is, by the pivotally-supporting member 28a included in the turn member 28. The shaft body 29 of the first pivotally-supporting member 28a penetrates the turn member 28 and a tip end portion of the first attachment portion 27a.

As shown in FIG. 4, FIG. 5 and FIG. 7, the second attachment portion 27b is arranged under the lower plate 8b and between the first side plate 8c and the second side plate 8d of the boom 8. The second attachment portion 27b extends in the longitudinal direction of the boom 8.

A rear end portion of the second attachment portion 27b is pivotally supported by a pivotally-supporting portion 30a (hereinafter referred to as "a second pivotally-supporting portion 30a"). The pivotally-supporting portion 30a is disposed on a connection member 30 described later. The second pivotally-supporting portion 30a includes a shaft body 31 (hereinafter referred to as "a second shaft body 31") that penetrates the connection member 30 in the machine width direction.

As shown in FIG. 4 and FIG. 7, the intermediate portion 27c connects a lower portion of a rear end of the first attachment portion 27a to a lower portion of a front end of the second attachment portion 27b. In this manner, the first attachment portion 27a and the second attachment portion 27b are integrated, and the extension member 27 is prevented from touching the stopper 33.

The intermediate portion 27c extends passing through (striding over) a space under the first side plate 8a of the boom 8 in the machine width direction. The intermediate portion 27c is arranged behind the stopper 33 (to the boom backward direction).

Figure 10:
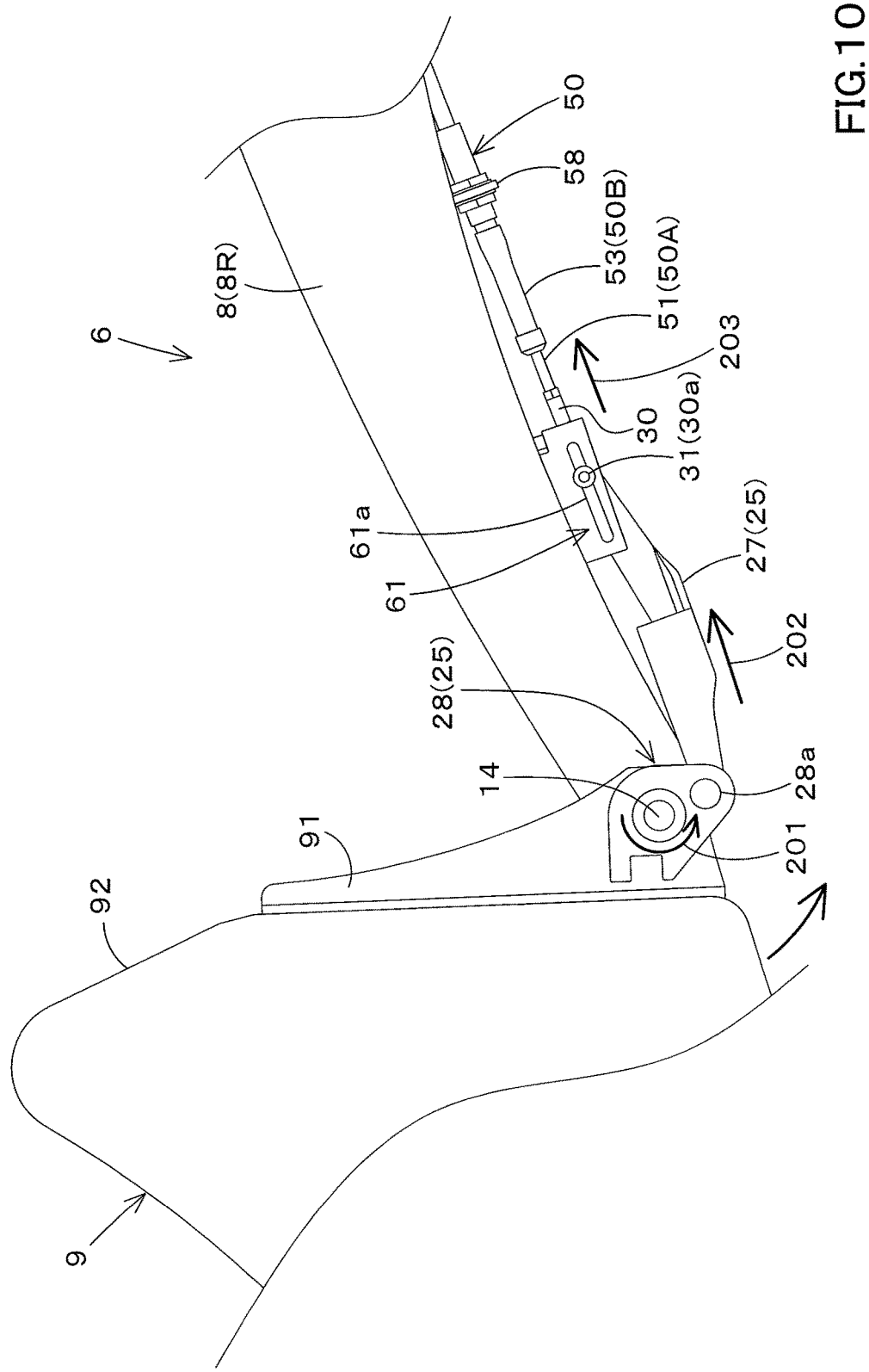
FIG. 10 is a side view illustrating movements of a first movable member and the like in a dumping movement of the bucket according to the first embodiment.
Figure 11:
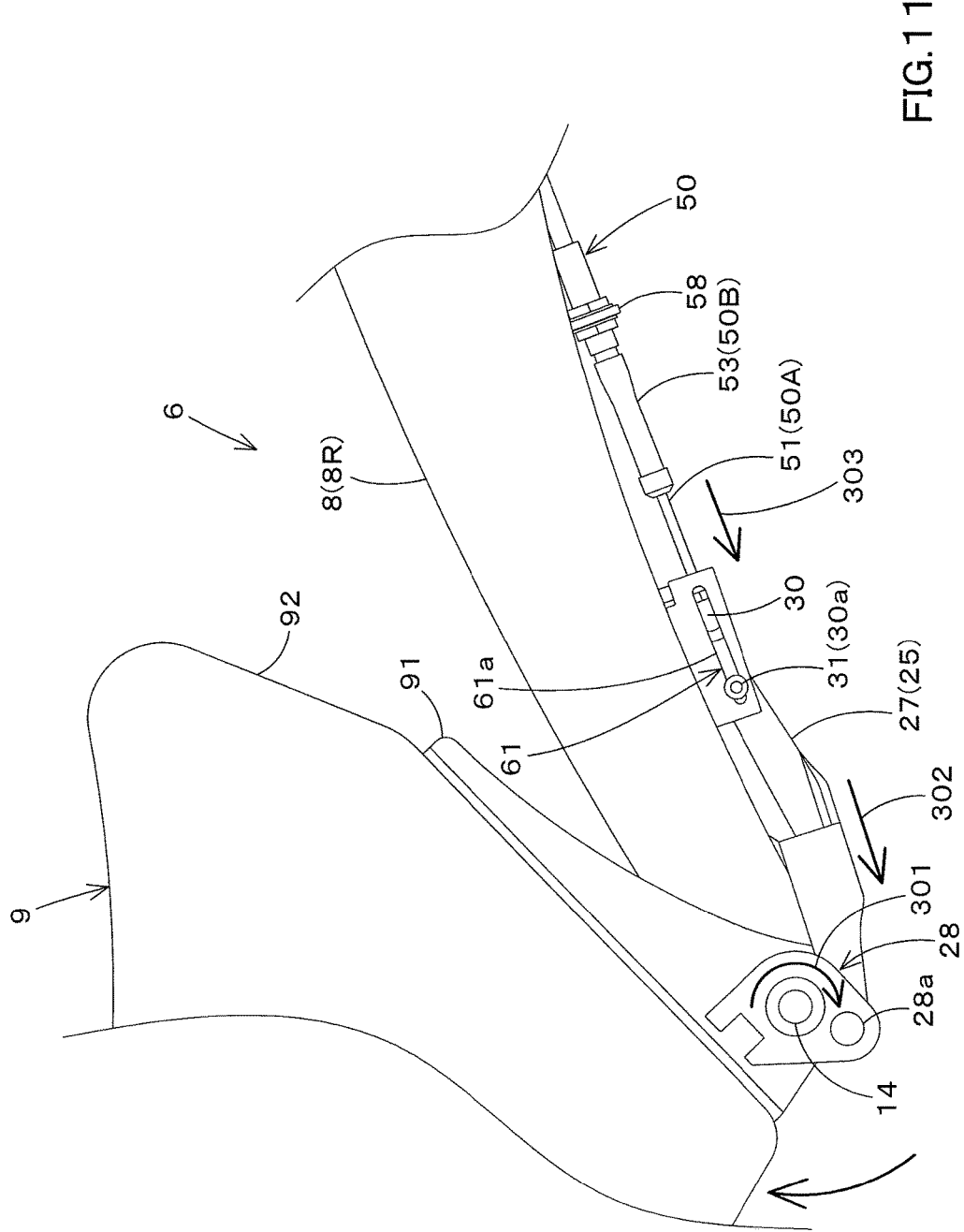
FIG. 11 is a side view illustrating movements of the first movable member and the like in a shoveling movement of the bucket according to the first embodiment.

As shown in FIG. 10 and FIG. 11, the first movable member 25 turns about the first pivot shaft 14 in accordance with the movement (the dumping movement, the shoveling movement) of the bucket 9.

As shown in FIG. 10, when the bucket 9 performs the dumping movement around the first pivotal shaft 14, the turn member 28 turns around the first pivotal shaft 14 in one direction (in a direction indicated by an arrowed line 201 of FIG. 10) together with the bucket bracket 91. In this manner, the first pivotally-supporting portion 28a disposed on the turn member 28 turns around the first pivotal shaft 14 in one direction, and the extension member 27 pivotally supported by the first pivotally-supporting portion 28a moves in the boom backward direction (in a direction indicated by an arrowed line 202 of FIG. 10).

As shown in FIG. 11, when the bucket 9 performs the shoveling movement around the first pivotal shaft 14, the turn member 28 turns around the first pivotal shaft 14 in the other direction (in a direction indicated by an arrowed line 301 of FIG. 11) together with the bucket bracket 91. In this manner, the first pivotally-supporting portion 28a disposed on the turn member 28 turns around the first pivotal shaft 14 in the other direction, and the extension member 27 pivotally supported by the first pivotally-supporting portion 28a moves in the boom forward direction (in a direction indicated by an arrowed line 302 of FIG. 11).

<Second Movable Member>

As shown in FIG. 1 to FIG. 3 and FIG. 8, the second movable member 26 is disposed on a base end side of the boom 8. As shown in FIG. 8, the second movable member 26 is connected to the level control valve 18.

The second movable member 26 moves to one direction and to the other direction, and thereby switches the level control valve 18 to the first state and to the second state. A motion (the movement) of the second movable member 26 will be explained below in details.

Figure 12:
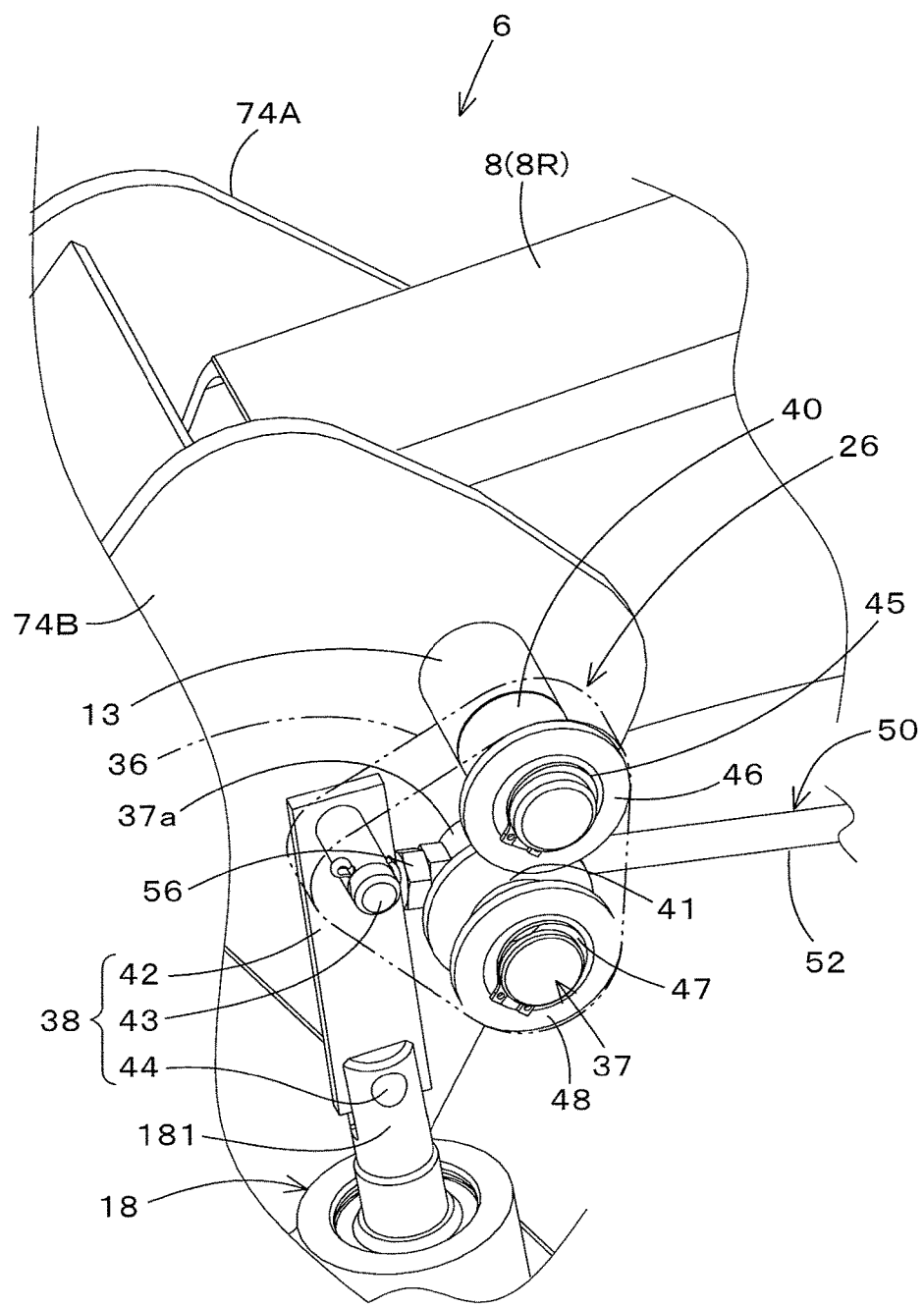
FIG. 12 is a view illustrating an enlarged part of FIG. 8 according to the first embodiment.
Figure 13:
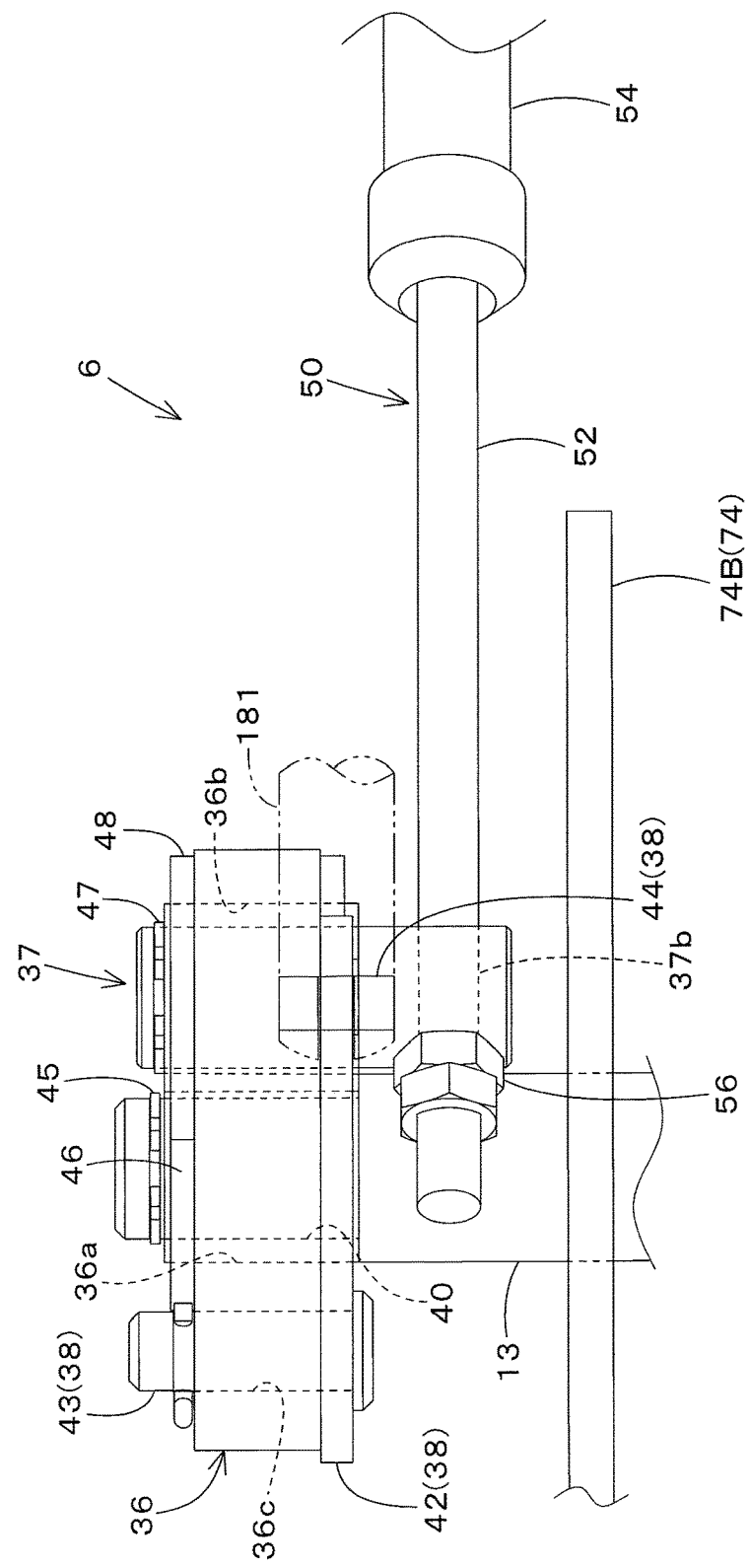
FIG. 13 is a view of the base portion of the boom included in the front loader according to the first embodiment.

As shown in FIG. 8, FIG. 12 and FIG. 13, the second movable member 26 includes a linkage member 36, a pin 37 and a connecting portion 38. For convenience of illustrating the drawings, FIG. 12 employs vertical lines to illustrate the linkage member 36.

Figure 14:
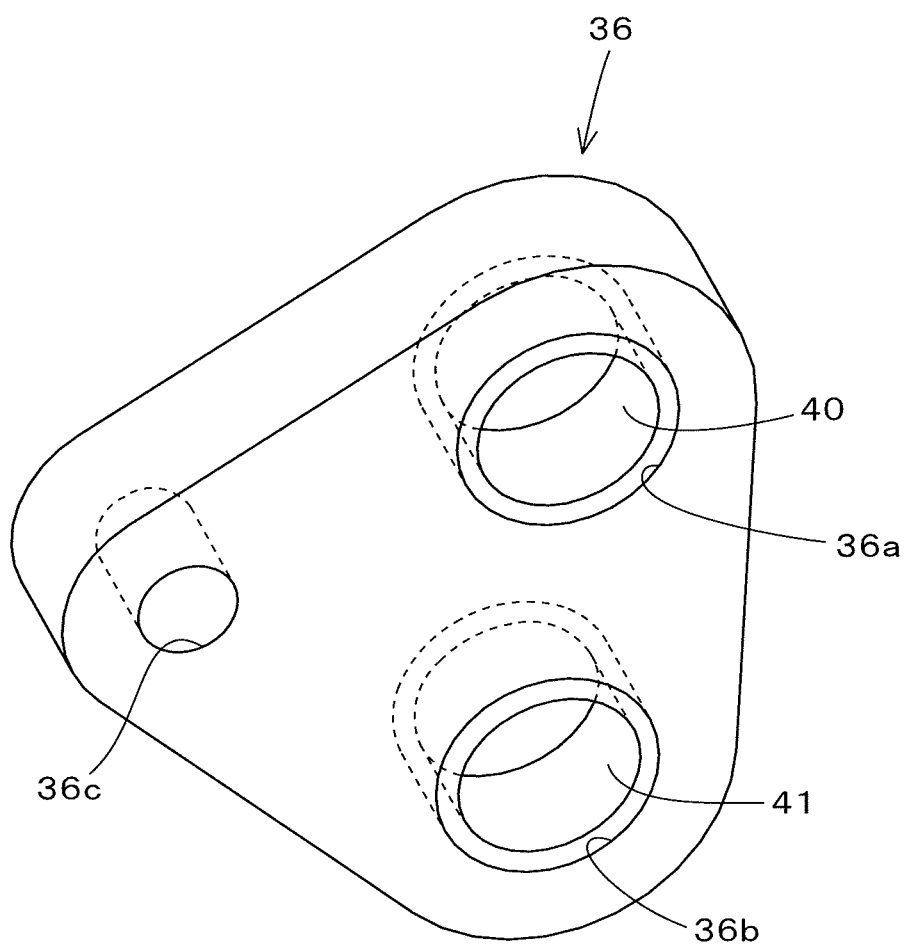
FIG. 14 is a perspective view of a linkage member according to the first embodiment.

The linkage member 36 is pivotally supported by the second pivotal shaft 13, and thus is capable of being turned about the second pivotal shaft 13. The linkage member 36 is disposed on an outer side of the outer side frame 74B in the machine outward direction. As shown in FIG. 14, the linkage member 36 is constituted of a plate having a substantially-triangle shape, and have a thickness constant in the machine width direction. The link member 36 includes a first hole 36a, a second hole 36b and a third hole 36c.

Each of the first hole 36a, the second hole 36b and the third hole 36c is formed to have a cylindrical shape penetrating the linkage member 36 in a thickness direction (in the machine width direction). The first hole 36a, the second hole 36b and the third hole 36c form a triangle shape and are arranged on corners of the triangle shape. The first hole 36a is arranged on an upper portion of the linkage member 36. The second hole 36b is arranged on a lower portion of the linkage member 36. The third hole 36c is arranged behind the first hole 36a and the second hole 36b.

A first bushing 40 is inserted to an inner portion of the first hole 36a, the first bushing 40 having a cylindrical shape. A second bushing 41 is inserted to an inner portion of the second hole 36b, the second bushing 41 having a cylindrical shape. The first bushing 40 and the second bushing 41 help the linkage member 36 smoothly turning about the second pivotal shaft 13.

As shown in FIG. 8, FIG. 12 and FIG. 13, the second pivotal shaft 13 extends from the outer side frame 74B toward the machine outward direction. The second pivotal shaft 13 penetrates the first bushing 40 and the first hole 36a of the linkage member 36. A first snap ring 45 is attached to one end portion of the second pivotal shaft 13 (an outer side in the machine outward direction), the one end portion protruding from the first hole 36a.

A first circular plate 46 is arranged between the first snap ring 45 and the linkage member 36. The first circular plate 46 touches an outer surface (an outer surface in the machine outward direction) of the linkage member 36.

The pin 37 is attached to the linkage member 36. The pin 37 has a cylindrical shape, and penetrates the second bushing 41 and the second hole 36b of the linkage member 36. A second snap ring 47 is attached to one end portion of the pin 37 (an outer side in the machine outward direction), the one end portion protruding from the second hole 36b.

A second circular plate 48 is arranged between the second snap ring 47 and the linkage member 36. The second circular plate 48 touches the outer surface (the outer surface in the machine outward direction) of the linkage member 36. A through hole 37b is formed on a portion 37a (hereinafter referred to as "a base portion 37a") protruding from the second hole 36b, the portion 37a being the other end portion of the pin 37 (an inner side in the machine inward direction).

A direction extending along a center axis (a center axis direction) of the through hole 37b intersects (perpendicularly) with a direction extending along a center axis (a center axis direction) of the pin 37. The other end portion (the base end portion) of the wire 50 is inserted to the through hole 37b. The other end portion of the wire 50 is capable of being moved toward one direction in the center axis direction of the through hole 37b and toward the other direction in the center axis direction of the through hole 37b.

The connecting portion 38 is a portion for connecting the linkage member 36 to the spool 181 of the level control valve 18. The connecting portion 38 includes a connection plate 42, a first connection shaft 43 and a second connection shaft 44.

The connection plate 42 is a flat plate having a rectangular shape, and is arranged between the linkage member 36 and the outer side frame 74B.

One end portion of the connecting portion 38 in a longitudinal direction is connected to the linkage member 36 by the first connection shaft 43. The first connection shaft 43 penetrates the connecting portion 38 and the third hole 36c of the linkage member 36. The one end portion of the connecting portion 38 in the longitudinal direction is capable of turning about the first connection shaft 43 with respect to the linkage member 36.

The other end portion of the connecting portion 38 in a longitudinal direction is connected to the spool 181 of the level control valve 18 by the second connection shaft 43. The second connection shaft 44 penetrates the connecting portion 38 and the spool 181. The other end portion of the connecting portion 38 in the longitudinal direction is capable of turning about the second connection shaft 44 with respect to the spool 181.

<Wire>

The wire 50 operates (switches) the level control valve 18 from the first state to the second state in accordance with the moving-up (the upward movement) of the boom 8, and operates (switches) the level control valve 18 from the second state to the first state in accordance with the moving-down (the downward movement) of the boom 8.

As shown in FIG. 1 to FIG. 3 and the like, the wire 50 extends in the longitudinal direction (the boom longitudinal direction). The wire 50 is capable of bowing due to the swinging of the boom 8 and the bucket 9. The wire 50 is constituted of metal and the like.

The wire 50 according to the embodiment connects the first movable member 25 to the second movable member 26. The wire 50 moves the second movable member 26 to one direction in accordance with the moving-up (the upward movement) of the boom 8, and moves the second movable member 26 to the other direction in accordance with the moving-down (the downward movement) of the boom 8. The moving (the movement) of the wire 50 will be explained below in detail.

The wire 50 according to the embodiment is constituted of a push-pull wire. As shown in FIG. 5, FIG. 8 and the like, the wire 50 includes an inner member 50A and an outer member 50B. The inner member 50A is inserted to the outer member 50B, and is capable of moving (sliding) in the outer member 50B, that is, moving (sliding) relatively with respect to the outer member 50B.

The inner member 50A includes a first rod 51, a second rod 52 and a wire rod 55. The outer member 50B includes a first cylindrical body 53, a second cylindrical body 54 and a covering body 59.

As shown in FIG. 4, FIG. 5 and the like, the first rod 51 is positioned on one end portion (a tip end portion) of the wire 50. A base end portion of the first rod 51 is inserted to an inner portion of the first cylindrical body 53, and is connected to one end portion (a tip end portion) of the wire rod 55 in the inner portion of the first cylindrical body 53.

A tip end portion of the first rod 51 protrudes from the first cylindrical body 53, and is connected to the extension member 27 of the first movable member 25 by the connection member 30.

The first cylindrical body 53 is supported by the first bracket 57. In particular, the first cylindrical body 53 is fitted into a notch 57e of the first supporting portion 57b of the first bracket 57, thereby being supported by the first bracket 57.

The connection member 30 is disposed on one end portion of the wire 50, and includes a second pivotally-supporting portion 30a and a connecting portion 30b. As shown in FIG. 5 and FIG. 7, the second pivotally-supporting portion 30a includes a branched portion 39 and the second shaft body 31.

The branched portion 39 is formed to have a forked shape (a U-shape). The branched portion 39 is arranged to sandwich a rear end portion of the second attachment portion 27b of the first movable member 25 between an inner side in the machine inward direction and an outer side in the machine outward direction. The second pivotally-supporting portion 30a includes a through hole. The second shaft body 31 is arranged through the through hole of the second pivotally-supporting portion 30a.

The connection member 30 is capable of turning about the second shaft body 31 of the second pivotally-supporting portion 30a with respect to the extension member 27 of the first movable member 25. In other words, the connection member 30 includes the second pivotally-supporting portion 30a pivotally supported by the extension member 27 of the first movable member 25, and thus is capable of turning about the extension member 27.

The connecting portion 30b is disposed behind the second pivotally-supporting portion 30a, and is connected to one end portion of the first rod 51. In this manner, one end portion of the wire 50 is connected to the connection member 30.

As shown in FIG. 4, FIG. 5 and the like, the one end portion of the wire 50 is supported by a support member 61, that is, by the connection member 30. The support member 61 is fixed to the tip end portion of the boom 8. The support member 61 according to the embodiment is formed integrally with the first bracket.

In particular, the support member 61 is disposed on a front portion of the first bracket 57 as shown in FIG. 5. In more particular, the support member 61 is disposed extending downward from the front portion of the first fixing portion 57a (in a direction separating from the lower surface of the lower plate 8b) in front of the first supporting portion 57b.

The support member 61 is constituted of a rectangular plate elongated in the boom longitudinal direction. One surface of the support member 61 faces to the machine inward direction, and the other surface of the support member 61 faces to the machine outward direction.

The support member 61 supports one end portion (the tip end portion) of the wire 50 and allows the end portion to move in a longitudinal direction of the wire 50. The support member 61 includes an edge portion 61a forming a slotted hole elongated in the boom longitudinal direction (the slotted hole hereinafter will be referred to as "a slotted hole 61a"). One end portion of the second shaft body 31 of the second pivotally-supporting portion 30a (an end portion on an inner side in the machine inward direction) is inserted to the slotted hole 61a.

The second shaft body 31 is capable of move along the slotted hole 61a in the boom longitudinal direction. When the second shaft body 31 moves along the slotted hole 61a, the first rod 51 moves in the boom longitudinal direction, the first rod 51 being disposed on one end portion of the wire 50.

The longitudinal direction of the slotted hole 61a corresponds to the longitudinal direction of the wire 50. Thus, the movement of one end portion of the wire 50 along the slotted hole 61a moves the wire 50 in the longitudinal direction of the wire 50.

That is, the slotted hole 61a of the support member 61 restricts the movement direction of the wire 50 to the longitudinal direction of the wire 50. In this manner, the wire 50 is prevented from being bent due to the moment that is generated by the swinging of the bucket 9, the wire 50 moving in accordance with the swinging of the bucket 9.

The support member 61 has the configuration capable of supporting one end portion of the wire 50 and allowing the one end portion to move in the longitudinal direction of the wire 50, the configuration being not limited to the above-described configuration.

As shown in FIG. 8, FIG. 12 and FIG. 13, the second rod 52 is positioned on the other end portion (the base end portion) of the wire 50. The base end portion of the second rod 52 protrudes from the second cylindrical body 54, and is inserted to the through hole 37b of the pin 37. A member (a nut) 56 is attached to the base end portion of the second rod 52, the member (the nut) preventing the second rod 52 from slipping off from the through hole 37b.

A tip end portion of the second rod 52 is inserted to an inner portion of the second cylindrical body 54, and is connected to the other end portion (a base end portion) of the wire rod 55 in the inner portion of the second cylindrical body 54. The second cylindrical body 54 is supported by the second bracket 58. In particular, the second cylindrical body 54 is fitted into a notch 58e of the second supporting portion 58b of the second bracket 58, thereby being fixed to the second bracket 58.

The wire rod 55 is capable of bowing due to the swinging of the boom 8 and is constituted of a member that has a strength stronger than a tensile force generated by the swinging and the like of the boom 8. The wire rod 55 according to the embodiment is constituted of a metal rod.

The covering body 59 has a tubular shape and covers an outer circumference of the wire rod 55. The covering body 59 is made of material (for example, resin, rubber and the like) capable of bowing due to the swinging and the like of the boom 8. One end portion (a tip end portion) of the covering body 59 is connected to the first cylindrical body 53. The other end portion (a base end portion) of the covering body 59 is connected to the second cylindrical body 54.

Each of the inner members 50A (the first rod 51, the second rod 52 and the wire rod 55) is inserted to each of the outer members 50B, and is capable of moving relatively with respect to the outer members 50B (the first cylindrical body 53, the second cylindrical body 54 and the covering body 59).

Meanwhile, the outer members 50B are fixed to the boom 8 by the first bracket 57 and the second bracket 58. Thus, the inner members 50A are capable of moving relatively with respect to the boom 8 in the boom longitudinal direction.

Figure 15:
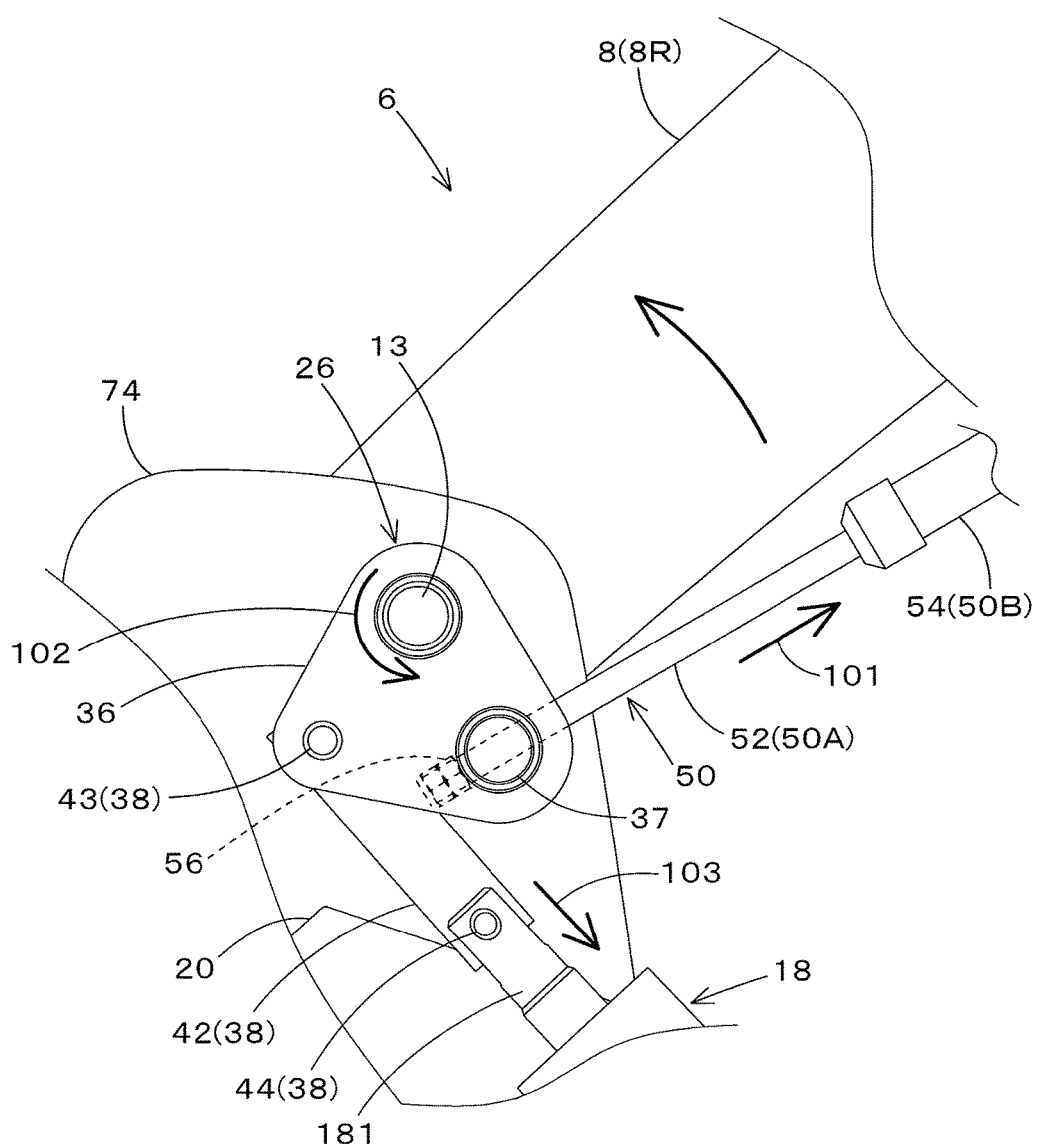
FIG. 15 is a side view illustrating movements of a second movable member and the like in a upward movement of the boom according to the first embodiment.

When the inner members 50A move to the boom forward direction, the first rod 51 increases a length of protruding from the first cylindrical body 53 (refer to FIG. 11), and the second rod 52 decreases a length of protruding from the second cylindrical body 54 (refer to FIG. 15).

Figure 16:
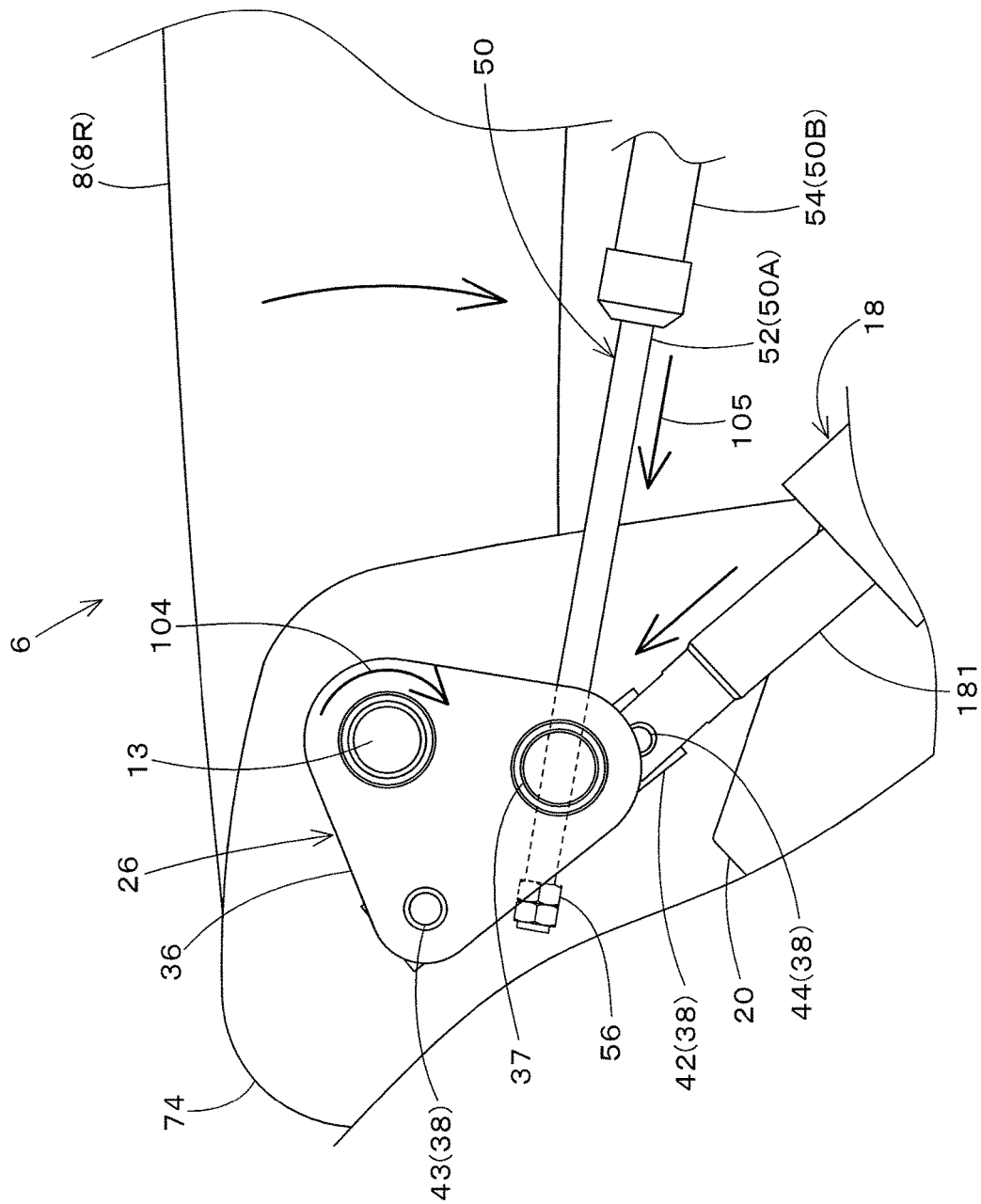
FIG. 16 is a side view illustrating movements of the second movable member and the like in a downward movement of the boom according to the first embodiment.

When the inner members 50A move to the boom backward direction, the first rod 51 decreases a length of protruding from the first cylindrical body 53 (refer to FIG. 10), and the second rod 52 increases a length of protruding from the second cylindrical body 54 (refer to FIG. 16).

As shown in FIG. 1, FIG. 3, FIG. 6 and the like, the wire 50 is arranged passing under the boom 8. In particular, the wire 50 is arranged passing under the boom 8 (the right boom 8R in the embodiment) on which the first movable member 25 is disposed.

In this manner, the wire 50 is prevented from interfering with a front view of an operator operating the front loader 6 in a work using the front loader 6 that is attached to the front portion of the work machine 1. As shown in FIG. 6, the wire 50 according to the embodiment is arranged along the lower surface of the boom 8 (the lower surface of the lower plate 8b) in a section A1 between the first movable member 25 and the lateral shaft 82, the lateral shaft 82 pivotally-supporting the other end portion of the boom cylinder 10.

As shown in FIG. 1, FIG. 3 and FIG. 6, the wire 50 is arranged passing above the boom cylinder 10 and under the lower plate 8b of the boom 8. That is, the wire 50 is arranged passing between the boom cylinder 10 and the lower plate 8b of the boom 8.

To be detailed, the wire 50 is arranged passing between the lower plate 8b of the boom 8 and the lateral shaft 82 pivotally-supporting the other end portion of the boom cylinder 10. In this manner, a position of the wire 50 is restricted in the vertical direction, and thus the wire 50 is prevented from interfering with the front view of the operator operating the front loader.

In addition, the wire 50 is arranged passing between the other end portion of the boom cylinder 10 and the lower plate 8b of the boom 8 and passing between the first side plate 8c of the boom 8 and the second side plate 8d of the boom 8. In this manner, the position of the wire 50 is restricted in the vertical direction and in the machine width direction, and thus the wire 50 is certainly prevented from interfering with the front view of the operator operating the front loader.

As shown in FIG. 3, the wire 50 is arranged passing the right side of the first side plate 8c of the boom 8 and the left side of the stand 60. That is, the wire 50 is arranged passing between the first side plate 8c and the stand 60 in the machine width direction.

In this manner, the wire 50 passes a position between the first side plate 8c and the stand 60. Accordingly, the position of the wire 50 is restricted in the machine width direction, and thus the wire 50 is prevented from interfering with the front view of the operator operating the front loader.

<Action>

The following explanations will describe actions (the movement of wire 50 and the level control valve 18 and the like) caused in accordance with the movement of the boom 8 and the bucket 9.

<In Upward Movement of the Boom>

Firstly, a case of the moving-up (the upward movement) of the boom 8 will be explained, the boom 8 being moved upward under a condition where the bucket 9 holds an attitude (a lift-up attitude) lifting up the shoveled earth and the like.

As shown in FIG. 15, when the boom 8 is moved upward (the upward movement), the inner member 50A of the wire 50 moves to the boom forward direction (to a direction indicated by an arrowed line 101). Then, the member (the nut) 56 touches the pin 37, the member 56 being attached to the base end portion of the second rod 52 of the inner member 50A, the member 56 pulls the pin 37 to the boom forward direction, and thus moves (turns) the second movable member 26 to one direction (a direction indicated by an arrowed line 102) around the second pivotal shaft 13.

That is, the wire 50 moves the second movable member 26 to one direction in accordance with the upward movement of the boom 8. The movement (turning) of the second movable member 26 moves the connecting portion 38 downward (to a direction indicated by an arrowed line 103) and pushes the spool 181 of the level control valve 18 down. When the spool 181 is pushed down, the level control valve 18 is switched from the neutral position 18a to the control position 18b.

In this manner, the level control valve 18 is set to the first state supplying the operation fluid to the bucket cylinder 11. That is, the second movable member 26 moves to one direction, and thereby switches the level control valve 18 to the first state.

When the level control valve 18 is switched to the first state, a part of the operation fluid supplied to the bottom (an upward movement side) of the boom cylinder 10 is supplied to the bottom (a dumping movement side) and the rod (a shoveling movement side) of the bucket cylinder 11.

In this manner, the bucket cylinder 10 is stretched on the basis of a difference between areas of a piston of the bucket cylinder 10, one area of the piston being on a side of the bottom, the other area of the piston being on a side of the rod, and thereby the bucket 9 performs the dumping movement.

That is, the bucket 9 performs the dumping movement in synchronization with the upward movement of the boom 8. Thus, the bucket 9 is held in the lift-up attitude, and contents such as the earth and sand in the bucket 9 is prevented from falling down from the bucket 9 in the upward movement of the boom 8.

<Stopping the Dumping Movement>

As shown in FIG. 10, when the bucket 9 performs the dumping movement, the turn member 28 turns to one direction (a direction indicated by an arrowed line 201) around the first pivotal shaft 14, and the first pivotally-supporting member 28a moves to the boom backward direction around the first pivotal shaft 14. Then, the extension member 27 moves to the boom backward direction (refer to an arrowed line 202 in FIG. 10), and the connection member 30 pivotally supported by the extension member 27 also moves to the boom backward direction.

In this manner, the second shaft body 31 of the second pivotally-supporting portion 30a moves to the boom backward direction along the slotted hole 61a of the support member 61. In addition, the first rod 51 is pushed to the boom backward direction in accordance with the connection member 30 moving to the boom backward direction, and thereby the first rod 51 moves (refer to an arrowed line 203 in FIG. 10).

When the first rod 51 moves to the boom backward direction, the inner member 50A including the wire rod 55 also moves to the boom backward direction.

As shown in FIG. 16, when the inner member 50A moves to the boom backward direction, the second movable member 26 moves (turns) to the other direction (a direction indicated by an arrowed line 104) around the second pivotal shaft 13, thereby releasing the force pushing the spool 181 of the level control valve 18 down.

Then, the spool 181 returns (is switched) from the control position 18b to the neutral position 18a due to the pressing force of the return spring. Thus, the level control valve 18 stops supplying the operation fluid to the bucket cylinder 11, thereby stops the dumping movement of the bucket 9.

<In Downward Movement of the Boom>

Next, a case of the moving-down (the downward movement) of the boom 8 will be explained, the boom 8 being moved downward under the condition where the bucket 9 holds the attitude (the lift-up attitude) lifting up the shoveled earth and the like.

As shown in FIG. 16, when the boom 8 is moved downward (the downward movement), the inner member 50A of the wire 50 moves to the boom backward direction (to a direction indicated by an arrowed line 105). Then, the inner member 50A pushes the pin 37 to the boom backward direction with a protruding length of the second movable member 26 from the pin 37 increased.

In this manner, the second movable member 26 moves (turns) to the other direction (a direction indicated by an arrowed line 104 in FIG. 16) around the second pivotal shaft 13. That is, the wire 50 moves the second movable member 26 to the other direction in accordance with the moving-down of the boom 8.

The movement (turning) of the second movable member 26 moves the connecting portion 38 upward, and thus releases the force pushing the spool 181 of the level control valve 18 down. Then, the spool 181 returns (is switched) from the control position 18b to the neutral position 18a due to the pressing force of the return spring.

In this manner, the level control valve 18 is set to the second state stopping supplying the operation fluid to the bucket cylinder 11. That is, the second movable member 26 moves to the other direction, and thereby switches the level control valve 18 to the second state.

When the level control valve 18 is switched to the second state, the bucket cylinder 10 is shortened to make the bucket 9 perform the shoveling movement. That is, the bucket 9 performs the shoveling movement in synchronization with the downward movement of the boom 8. In this manner, the bucket 9 is held in the lift-up attitude, and the contents such as the earth and sand in the bucket 9 is prevented from falling down from the bucket 9 in the downward movement of the boom 8.

<Stopping the Shoveling Movement>

As shown in FIG. 11, when the bucket 9 performs the shoveling movement, the turn member 28 of the first movable member 25 turns to the other direction (a direction indicated by an arrowed line 301) around the first pivotal shaft 14, and the first pivotally-supporting member 28a moves to the boom forward direction around the first pivotal shaft 14. Then, the extension member 27 of the first movable member 25 moves to the boom forward direction (refer to an arrowed line 302 in FIG. 11), and the connection member 30 pivotally supported by the extension member 27 also moves to the boom forward direction.

In this manner, the second shaft body 31 of the second pivotally-supporting portion 30a moves to the boom forward direction along the slotted hole 61a of the support member 61. In addition, the first rod 51 is pulled to the boom forward direction in accordance with the connection member 30 moving to the boom forward direction, and thereby the first rod 51 moves (refer to an arrowed line 303 in FIG. 11).

When the first rod 51 moves to the boom forward direction, the inner member 50A including the wire rod 5 moves to the boom forward direction.

As shown in FIG. 15, when the inner member 50A moves to the boom forward direction (the direction indicated by the arrowed line 101), the second movable member 26 moves (turns) to one direction (the direction indicated by the arrowed line 102) around the second pivotal shaft 13, thereby the second movable member 26 pushes the spool 181 of the level control valve 18 down.

The level control valve 18 is switched completely from the neutral position 18a to the control position 18b before the tilting angle of the bucket 9 with respect to the horizontal surface reaches "a falling-down range" in the shoveling movement of the bucket 9. In the falling-down range, the contents such as the earth and soil in the bucket 9 falls down from (is spilt from) the bucket 9.

That stops the supply of the operation fluid supplied from the bucket control valve 17 to the rod (the shoveling movement side) of the bucket cylinder 11 through a hydraulic tube (a hydraulic pipe) 23B, thereby stopping the shoveling movement of the bucket 9.

<Other Embodiments>

Other embodiments of the present invention will be described below mainly in a point different from the embodiment described above (hereinafter referred to as "a first embodiment").

In the first embodiment, the first movable member 25 includes the turn member 28 and the extension member 27. However, the first movable member 25 may has a configuration without the extension member 27. That is, the first movable member 25 may be constituted of the turn member 28 turning around the first pivotal shaft 14 without the extension member 27.

Figure 17:
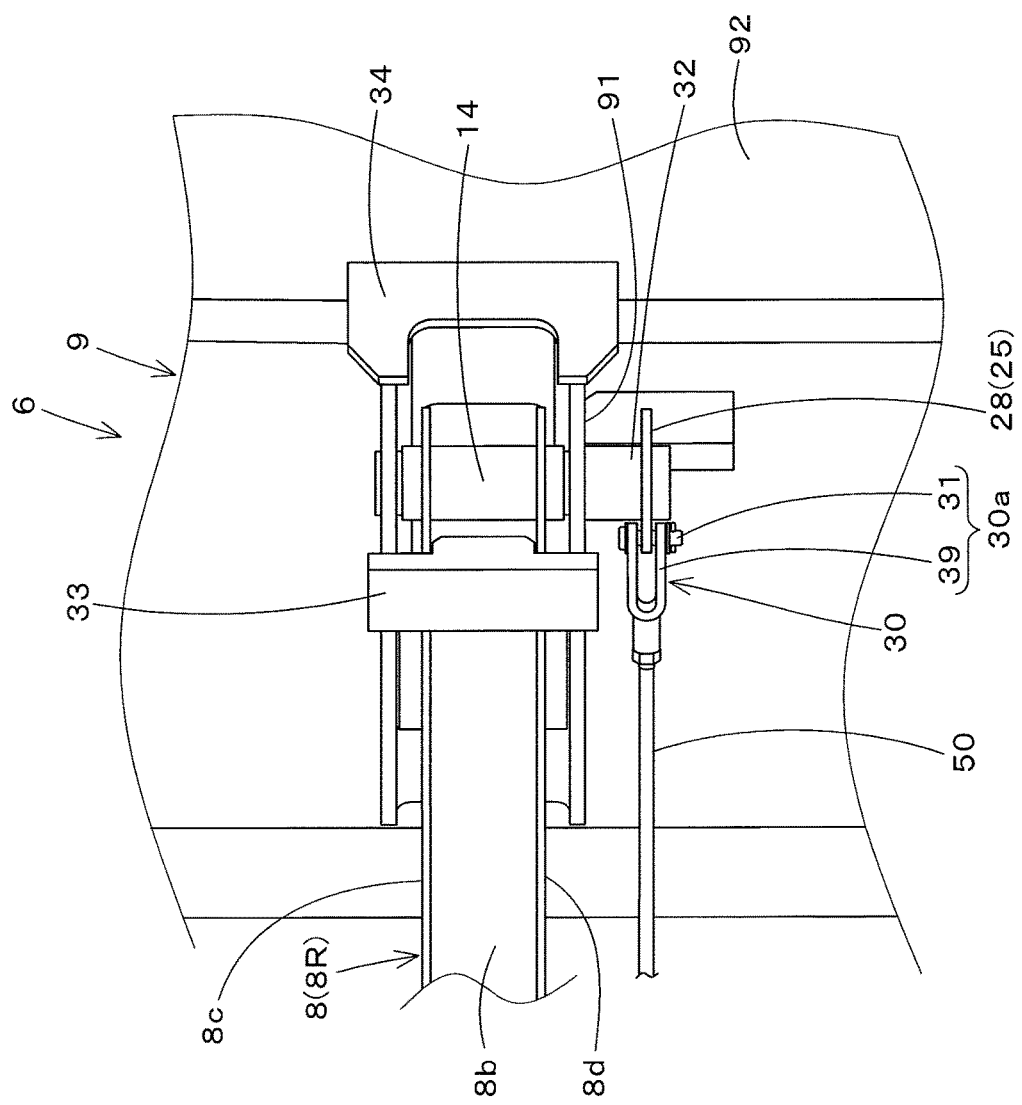
FIG. 17 is a bottom view of a configuration where a tip end of a wire is directly connected to a turn member according to a modified embodiment of the present invention.

In that configuration, as shown in FIG. 17, the second pivotally-supporting portion 30a of the connection member 30 is pivotally supported by the turn member 28, the connection member 30 being disposed on one end portion (the tip end portion) of the wire 50. In this manner, the turning of the turn member 28 around the first pivotal shaft 14 can be synchronized with the movement of the wire 50 without the extension member 27.

That configuration does not require a member constituting the extension member 28, thereby simplifying the construction of the front loader 6 and reducing the number of components of the front loader 6.

In the first embodiment, the wire 50 connects the first movable member 25 to the second movable member 26, and the second movable member 26 is connected to the level control valve 18. However, the second movable member 26 may be omitted. That is, the wire 50 may have a configuration to connect the first movable member 25 to the level control valve 18.

Figure 18:
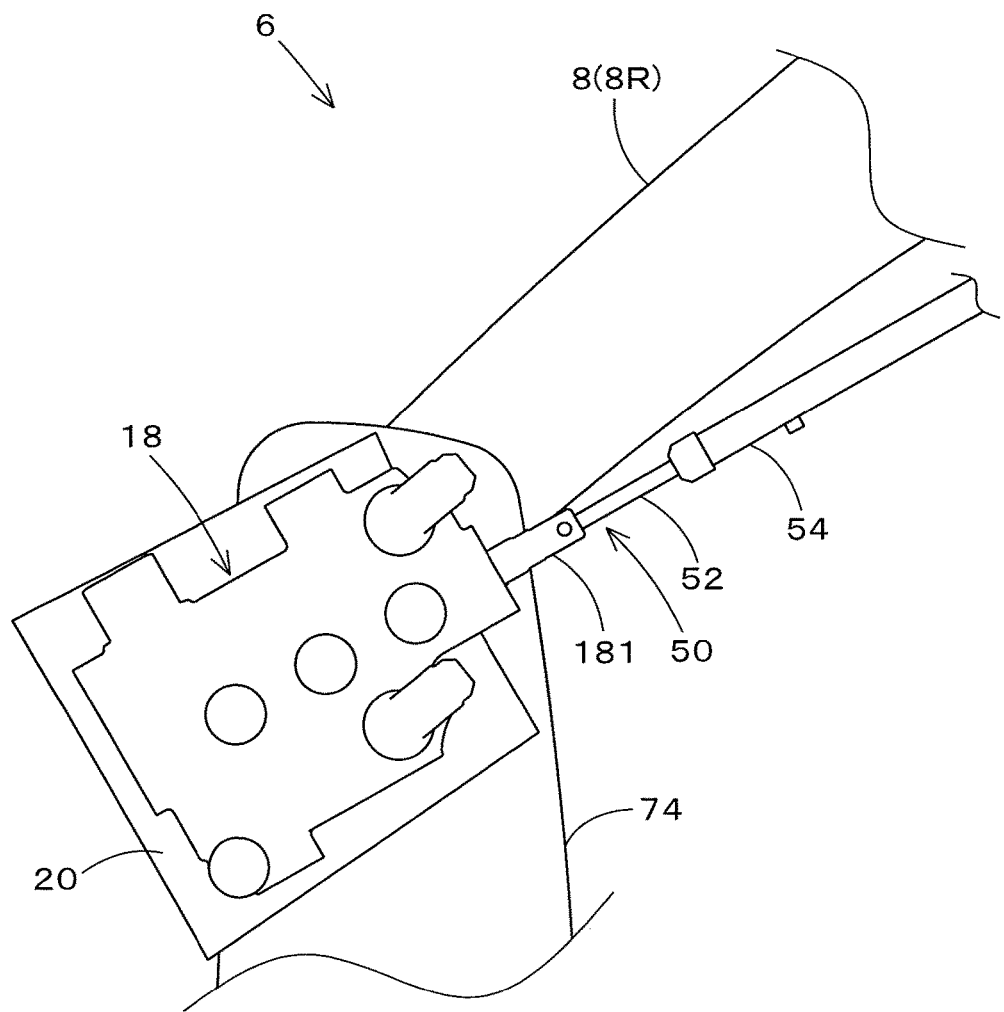
FIG. 18 is a side view of a configuration where a base end of the wire is directly connected to a spool of a control valve according to the modified embodiment.
Figure 19:
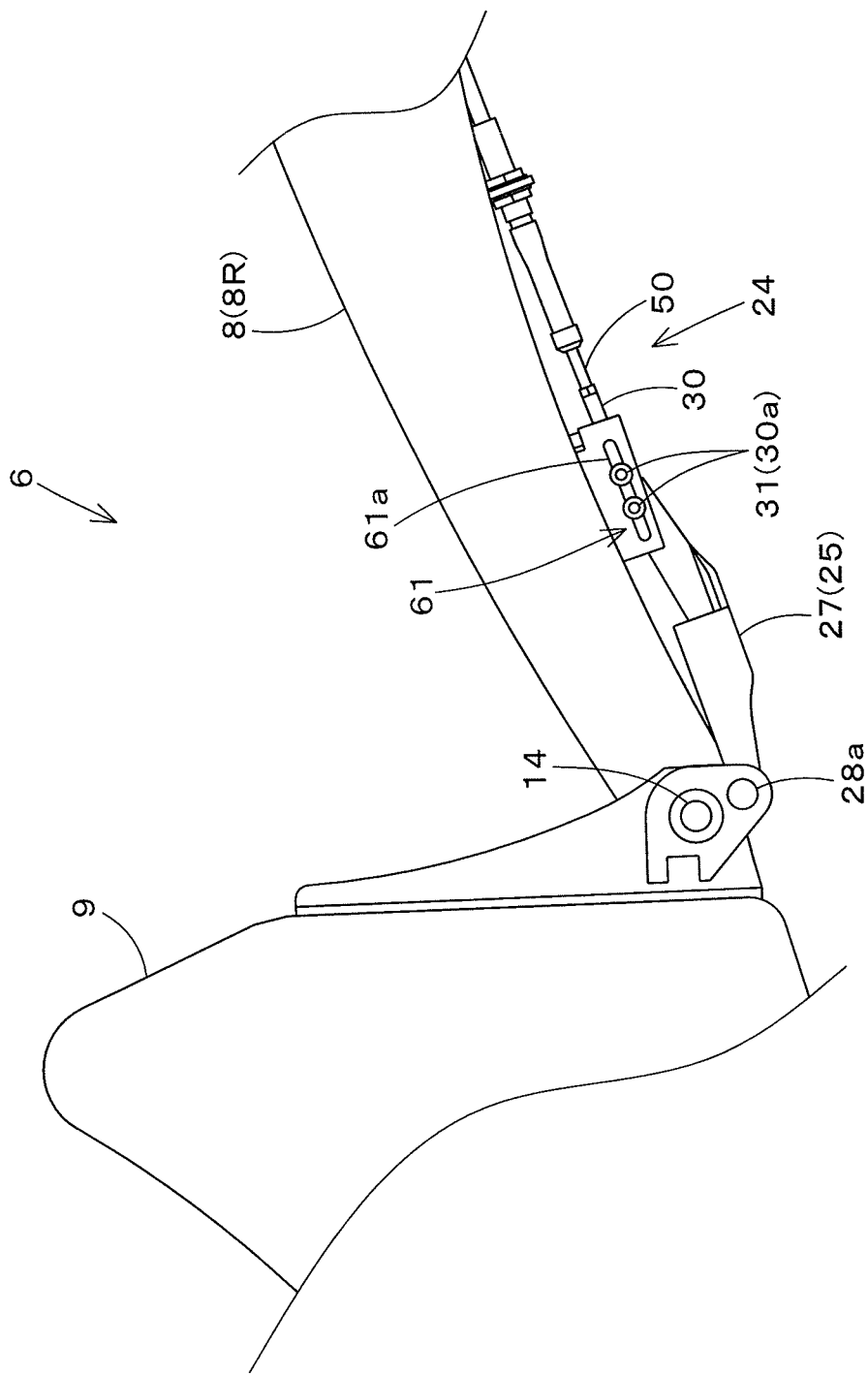
FIG. 19 is a side view of a configuration having a plurality of second pivotally-supporting portions according to the modified embodiment.

As shown in FIG. 18, that configuration directly connects the base end of the wire 50 to the spool 181 of the level control valve 18 (without the second movable member 26). The level control valve 18 is disposed such that the movement direction of the spool 181 corresponds to the movement direction (the longitudinal direction) of the wire 50.

In that configuration, the movement of the wire 50 can be synchronized with the movement of the spool 181 without the second movable member 26. That configuration does not require a member constituting the second movable member 26, thereby simplifying the construction of the synchronization mechanism 24 and reducing the number of components of the front loader 6.

In the first embodiment, the first movable member 25 pivotally supports the second pivotally-supporting portion 30a singularly. However, the first movable member 25 may pivotally support a plurality of the second pivotally-supporting portions 30a. In that case, the plurality of the second shaft bodies 31 are arranged in the longitudinal direction of the wire 50, and then the plurality of second shaft bodies 31 are inserted to the slotted hole 61a of the support member 61, the second shaft bodies 31 being arranged along the longitudinal direction of the slotted hole 61a.

In that configuration, the plurality of second pivotally-supporting portion 30a are arranged along the slotted hole 61a, and thus the connection member 30 is capable of linearly moving. In this manner, the wire 50 connected to the connection member 30 linearly moves to the longitudinal direction of the wire 50, and thereby the wire 50 can be prevented from bending.

Figure 20:
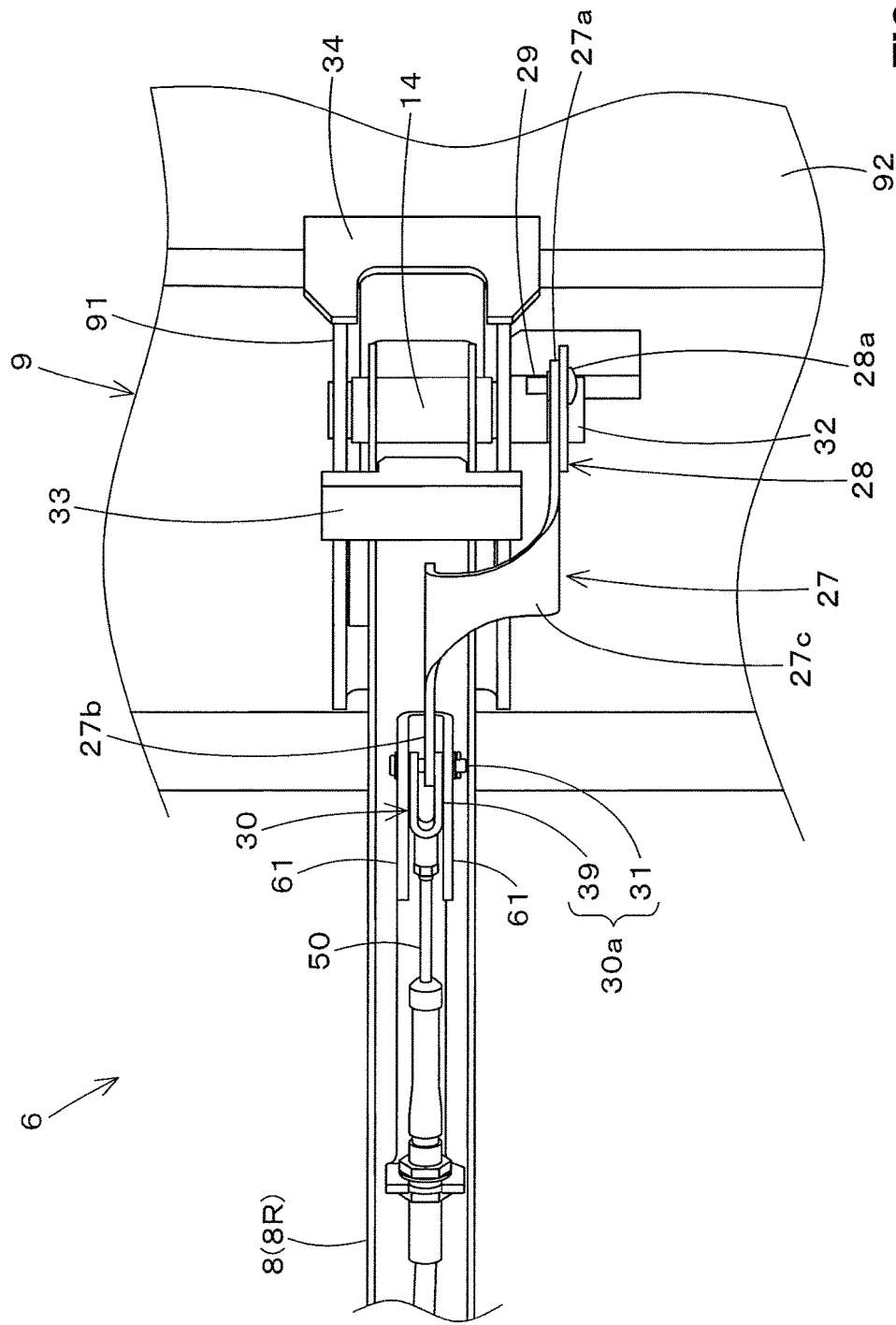
FIG. 20 is a bottom view of a configuration where a support member is disposed on one side of the second pivotally-supporting portion and another support member is disposed on the other side of the second pivotally-supporting portion in a machine width direction according to the modified embodiment.

In the first embodiment, the support member 61 is disposed only one side of the second pivotally-supporting portion 30a in the machine width direction. However, the support member 61 may be disposed one side and the other side of the second pivotally-supporting portion 30a in the machine width direction. In that case, the support member 61 is disposed on one end portion of the second shaft body 31 and another support member 61 is disposed on the other end portion of the second shaft body 31 as shown in FIG. 20.

Then, one end portion of the second shaft body 31 is supported by one of the support members 61, and the other end portion of the second shaft body 31 is supported by the other one of the support members 61. According to the configuration, the second pivotally-supporting portion 30a can be supported stably by the support members 61, and the second pivotally-supporting portion 30a can linearly move more certainly.

Figure 21:
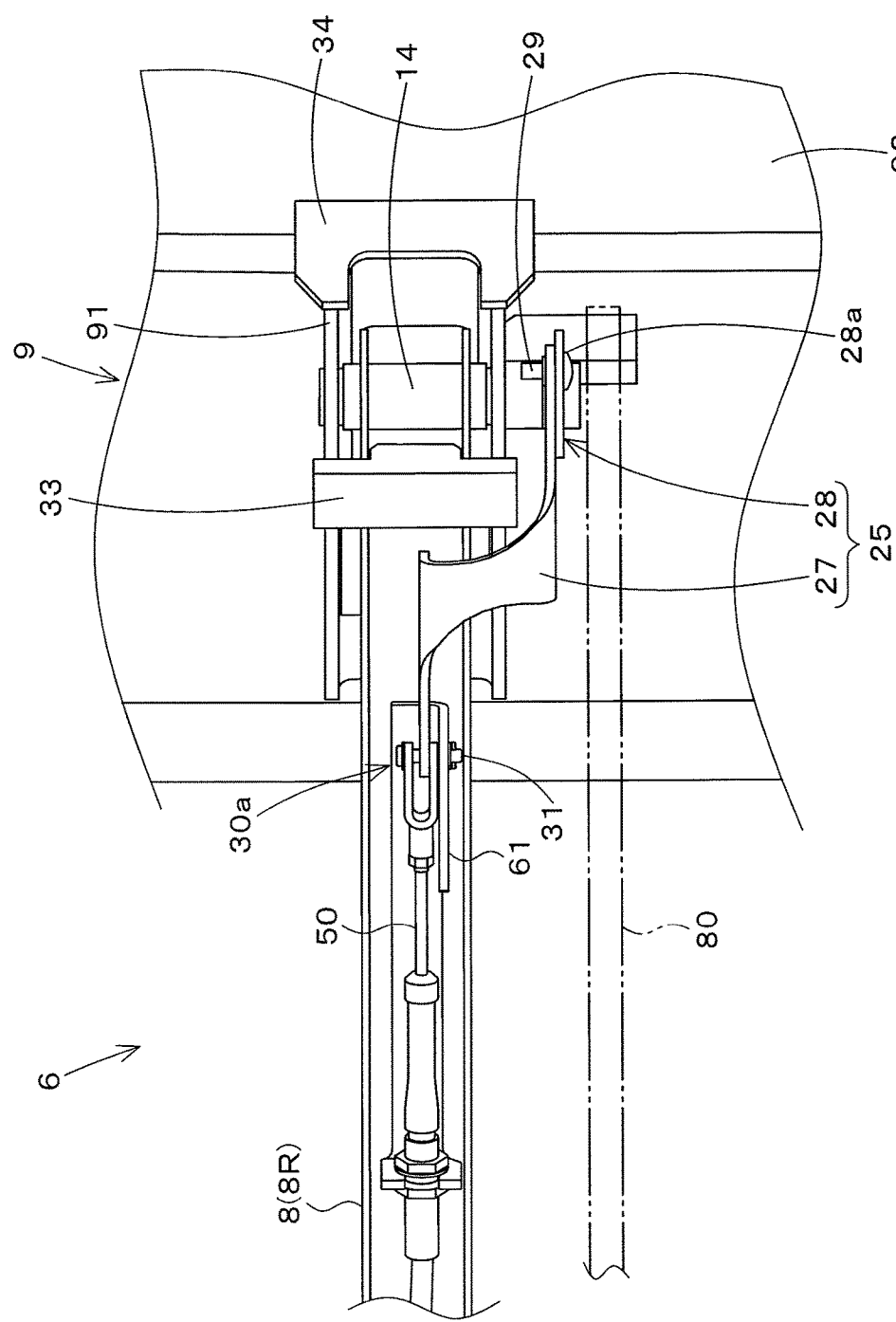
FIG. 21 is a bottom view of a configuration where restriction members are disposed on both sides of a first movable member in the machine width direction according to the modified embodiment.
Figure 22:
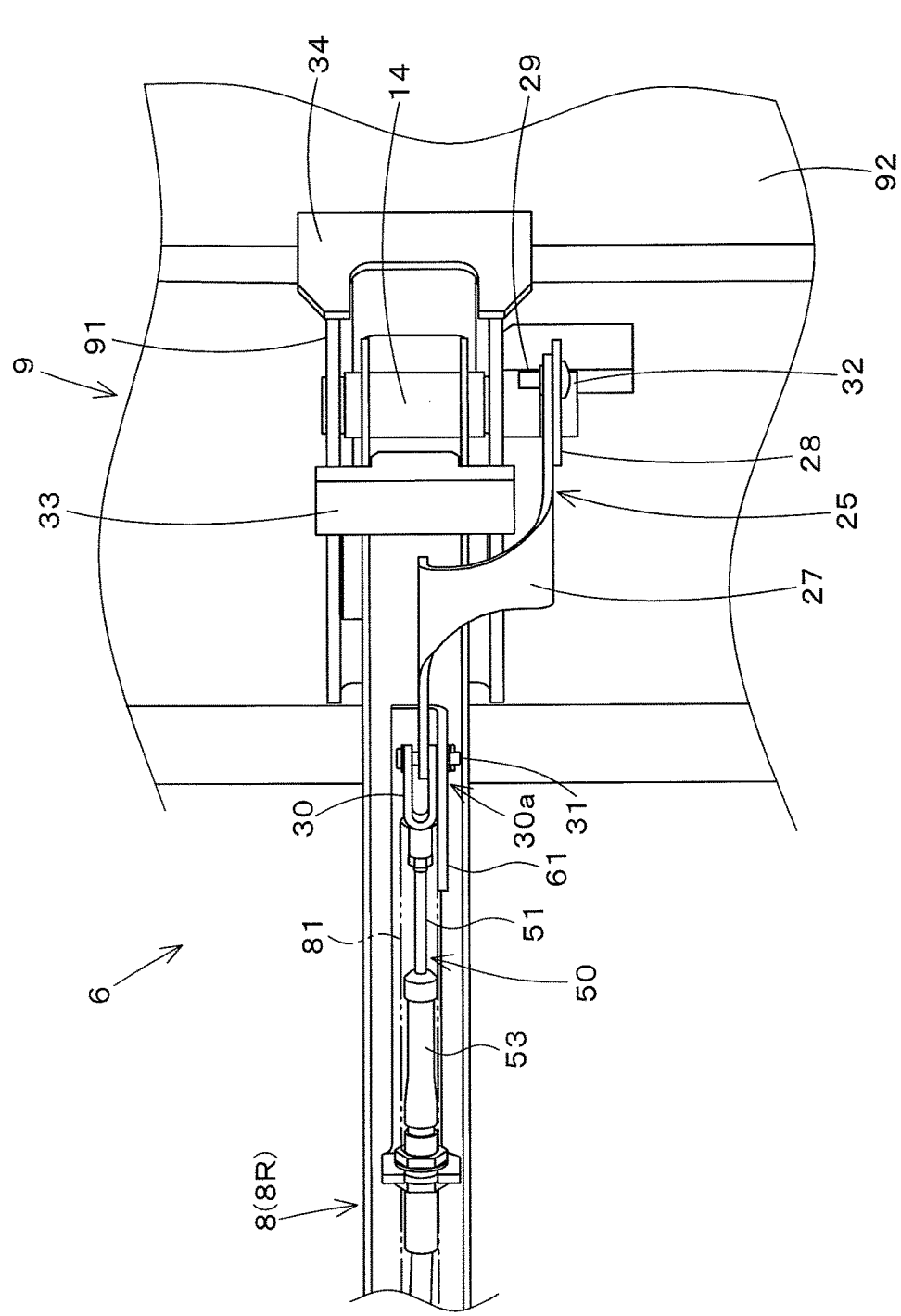
FIG. 22 is a bottom view of a configuration where one end portion of a wire is covered with a cover according to the modified embodiment.

As shown in FIG. 21, a restriction member 80 may be disposed on an inner side of the first movable member 25 in the machine inward direction or on an outer side of the first movable member 25 in the machine outward direction, the restriction member 80 restricting the movement of the wire 50 in the machine width direction. In FIG. 22, the restriction member 80 is disposed on the inner side of the first movable member 25 in the machine inward direction. However, the restriction member 80 may be disposed on the outer side of the first movable member 25 in the machine outward direction, and the restriction members 80 may be disposed on the inner side of the first movable member 25 in the machine inward direction and on the outer side of the first movable member 25 in the machine outward direction.

The restriction member 80 may be attached to the first side plate 8c, the second side plate 8d and the like of the boom 8, for example. In the first embodiment, the stand 60 attached along the boom 8 can serve as the restriction member. However, the restriction member may be disposed in addition to the stand 60.

In the first embodiment, the wire 50 is constituted of the push-pull wire having the inner member 50A and the outer member 50B. However, the wire 50 may be constituted of a spring wire.

In the case where the wire 50 is constituted of a spring wire, the wire 50 is formed of a wire rod that is made of metal and the like and is capable of bowing. A spring is attached to one end of the rod wire, another spring is attached to the other end of the rod wire, and thereby the wire 50 is pushed by the springs to one side and the other side of the longitudinal direction of the wire 50.

Then, the springs may be configured to be stretched and shortened in synchronization with the movement (the shoveling movement, the dumping movement) of the bucket 9 around the first pivotal shaft 14 and the swinging (the upward movement, the downward movement) of the boom 8 around the second pivotal shaft 13.

In addition, as shown by a vertical line in FIG. 22, the wire 50 may be provided with a cover 81 that covers one end portion of the wire 50. The provision of the cover 81 protects the wire 50 from the earth and sand, preventing the wire 50 from bending more certainly.

<Effects>

Effects of the front loader 6 and the work machine 1 according to the embodiments mentioned above will be explained below.

The front loader 6 includes the boom 8, the first pivotal shaft 14 disposed on a tip portion of the boom 8, the bucket 9 supported by the first pivotal shaft 14 to be capable of performing the shoveling movement and the dumping movement, the boom cylinder 10 to swing the boom 8, the bucket cylinder 11 to move the bucket 9 to make the bucket 9 perform the shoveling movement and the dumping movement, the control valve 18 to be switched to any one of the first state supplying the operation fluid to the bucket cylinder 11 and the second state stopping supplying the operation fluid to the bucket cylinder 11, the first movable member 25 to turn around the first pivotal shaft 14 in accordance with the movement of the bucket 9, and the wire 50 connecting the first movable member 25 to the control valve 18.

That configuration includes the wire 50 connecting the first movable member 25 to the control valve 18, the wire 50 serving as a mechanism for holding an attitude of the bucket 9 to prevent contents in the bucket 9 from falling down from the bucket 9. Thus, the mechanism is hard to interfere with the front view of the operator operating the front loader 6.

The front loader 6 includes the boom 8, the first pivotal shaft 14 disposed on the tip portion of the boom 8, the bucket 9 supported by the first pivotal shaft 14 to be capable of performing the shoveling movement and the dumping movement, the boom cylinder 10 to swing the boom 8, the bucket cylinder 11 to move the bucket 9 to make the bucket 9 perform the shoveling movement and the dumping movement, the control valve 18 to be switched to any one of the first state supplying the operation fluid to the bucket cylinder 11 and the second state stopping supplying the operation fluid to the bucket cylinder 11, the first movable member 25 to turn around the first pivotal shaft 14 in accordance with the movement of the bucket 9, the second movable member 26 connected to the control valve 18 and configured to move to one direction and to the other direction to switch the control valve 18 to the first state and to the second state, and the wire 50 connecting the first movable member 25 to the second movable member 26.

That configuration includes the wire 50 connecting the first movable member 25 to the second movable member 26, the wire 50 serving as a mechanism for holding an attitude of the bucket 9 to prevent contents in the bucket 9 from falling down from the bucket 9. Thus, the mechanism is hard to interfere with the front view of the operator operating the front loader 6.

The wire 50 switches the control valve 18 from the first state to the second state in accordance with an upward movement of the boom 8 and switches the control valve 18 from the second state to the first state in accordance with a downward movement of the boom 8.

According that configuration, the wire 50 synchronizes the upward movement and downward movement of the boom 8 with the switching of the control valve 18.

The wire 50 is arranged passing under the boom 8.

According to that configuration, the boom 8 is arranged above the wire 50, and thus the wire 50 is hard to interfere with the front view of the operator operating the front loader 6.

The boom 8 includes the upper plate 8a, the lower plate 8b, the first side plate 8c disposed on an outer side in the machine width direction and connecting the upper plate 8a to the lower plate 8b, and the second side plate 8d connecting the upper plate 8a to the lower plate 8b, and the wire 50 is arranged passing between the boom cylinder 50 and the lower plate 8b.

According to that configuration, the position of the wire 50 is restricted between the boom cylinder 10 and the lower plate 8b of the boom 8, and thus the wire 50 is hard to interfere with the front view of the operator operating the front loader 6.

The first movable member 25 includes the turn member 28 to turn around the first pivotal shaft 14; and the extension member 27 extending along the boom and having one end connected to the turn member 28 and the other end connected to the wire 50.

According to that configuration, one end portion of the wire 50 is arranged separating from the first pivotal shaft 14. In other words, the extension member 27 extending along the boom 8 separates one end portion of the wire 50 from the first pivotal shaft 14.

In this manner, the wire 50 is prevented from interfere with the ground when the front loader 6 is put on the ground.

In addition, in a case where the mud earth are scattered by the turning of the bucket 9 around the first pivotal shaft 14, the scattered mud and earth are prevented from being adhered to the wire 50. In this manner, smooth movement of the wire 50 is maintained for a long period of time.

The connection member 30 is disposed on one end portion of the wire 50, wherein the connection member 30 includes the pivotally-supporting portion (the second pivotally-supporting portion) 30a pivotally supported by the first movable member 25 to be turnable around the first movable member 25.

According to that configuration, the connection member 30 is capable of turning around the first movable member 25. Thus, the moment generated by the swinging of the bucket 9 is hard to be directly transmitted to the wire 50, and thereby the wire 50 is prevented from being bent due to the moment.

The support member 61 is fixed to the tip portion of the boom 8 and supports one end portion of the wire 50 to move the one end portion in the longitudinal direction of the wire 50.

According to that configuration, the movement direction of one end portion of the wire 50 is restricted to the longitudinal direction of the wire 50. Thus, the wire 50 is prevented from being bent due to the moment that is generated by the swinging of the bucket 9.

The second movable member 26 includes a linkage member 36 being turnable, the pin 37 fixed to the linkage member 36 and having a hole into which the other end portion of the wire 50 is inserted, and the connection portion 38 fixed to the linkage member 36 and connected to the spool 181 of the control valve 18.

According to that configuration, the movement of the wire 50 is transmitted to the pin 37, the linkage member 36 is turned about the second pivotal shaft 13 by the movement of the pin 37, and thereby the spool 181 of the control valve 18 can be operated.

That is, the movement of the wire 50 is synchronized with the movement of the second movable member 26, and thereby the spool 181 of the control valve 18 can be operated certainly and smoothly.

The front loader 6 includes the cover 81 covering one end portion of the wire 50.

According to that configuration, one end portion of the wire 50 is protected by the cover 81, and thereby the mud and earth scattered by the movement of the bucket 9 are prevented from being adhered to the wire 50.

The work machine 1 includes the front loader according to the embodiments mentioned above, and the vehicle body 2 supporting the front loader 6.

According to that configuration, the work machine 1 includes the wire 50 that serves as the mechanism for holding the attitude of the bucket 9 to prevent contents in the bucket 9 from falling down from the bucket 9, and thus the mechanism is hard to interfere with the front view of the operator operating the front loader 6.

In the above description, the embodiment of the present invention has been explained. However, all the features of the embodiments disclosed in this application should be considered just as examples, and the embodiments do not restrict the present invention accordingly. A scope of the present invention is shown not in the above-described embodiments but in claims, and is intended to include all modifications within and equivalent to a scope of the claims.

What is claimed is:

1. A front loader comprising:
   a boom;
   a first pivotal shaft disposed on a tip portion of the boom;
   a bucket supported by the first pivotal shaft to be capable of performing a shoveling movement and a dumping movement;
   a boom cylinder to swing the boom;
   a bucket cylinder to move the bucket to make the bucket perform the shoveling movement and the dumping movement;
   a control valve to be switched to any one of a first state supplying an operation fluid to the bucket cylinder and a second state stopping supplying the operation fluid to the bucket cylinder;
   a first movable member to turn around the first pivotal shaft in accordance with the movement of the bucket; and
   a wire connecting the first movable member to the control valve, the wire being arranged passing under the boom.

2. A front loader comprising:
   a boom;
   a first pivotal shaft disposed on a tip portion of the boom;
   a bucket supported by the first pivotal shaft to be capable of performing a shoveling movement and a dumping movement;
   a boom cylinder to swing the boom;
   a bucket cylinder to move the bucket to make the bucket perform the shoveling movement and the dumping movement;
   a control valve to be switched to any one of a first state supplying an operation fluid to the bucket cylinder and a second state stopping supplying the operation fluid to the bucket cylinder;
   a first movable member to turn around the first pivotal shaft in accordance with the movement of the bucket;

a connection plate connected to a spool of the control valve;
a second movable member arranged outside the control valve and configured to move to one direction and to the other direction to switch the control valve to the first state and to the second state;
a connection shaft connecting the connection plate to the second movable member; and
a wire connecting the first movable member to the second movable member.

3. The front loader according to claim 1, wherein the wire switches the control valve from the first state to the second state in accordance with an upward movement of the boom and switches the control valve from the second state to the first state in accordance with a downward movement of the boom.

4. The front loader according to claim 2, wherein the wire moves the second movable member to the one direction in accordance with an upward movement of the boom and moves the second movable member to the other direction in accordance with a downward movement of the boom.

5. The front loader according to claim 2, wherein the wire is arranged passing under the boom.

6. The front loader according to claim 1, wherein the boom includes:
   an upper plate;
   a lower plate;
   a first side plate connecting the upper plate to the lower plate; and
   a second side plate connecting the upper plate to the lower plate, and
the wire is arranged passing between the boom cylinder and the lower plate.

7. The front loader according to claim 1, wherein the first movable member includes:
   a turn member to turn around the first pivotal shaft; and
   an extension member extending along the boom and having one end connected to the turn member and the other end connected to the wire.

8. The front loader according to claim 2, wherein the first movable member includes:
   a turn member to turn around the first pivotal shaft; and
   an extension member extending along the boom and having one end connected to the turn member and the other end connected to the wire.

9. The front loader according to claim 1, comprising
a connection member disposed on one end portion of the wire, wherein
the connection member includes
   a pivotally-supporting portion pivotally supported by the first movable member to be turnable around the first movable member.

10. The front loader according to claim 2, comprising
a connection member disposed on one end portion of the wire, wherein
the connection member includes
   a pivotally-supporting portion pivotally supported by the first movable member to be turnable around the first movable member.

11. The front loader according to claim 1, comprising
a support member fixed to the tip portion of the boom and supporting one end portion of the wire to move the one end portion in a longitudinal direction of the wire.

12. The front loader according to claim 2, comprising
a support member fixed to the tip portion of the boom and supporting one end portion of the wire to move the one end portion in a longitudinal direction of the wire.

13. The front loader according to claim 2, wherein the second movable member includes:
   a linkage member being turnable;
   a pin fixed to the linkage member and having a hole into which the other end portion of the wire is inserted; and
   a connection portion fixed to the linkage member and connected to the control valve.

14. The front loader according to claim 1, comprising
a cover covering one end portion of the wire.

15. The front loader according to claim 2, comprising
a cover covering one end portion of the wire.

16. A work machine comprising:
the front loader according to claim 1; and
a vehicle body supporting the front loader.

17. A work machine comprising:
the front loader according to claim 2; and
a vehicle body supporting the front loader.

18. A front loader comprising:
a boom;
a bucket supported by a first pivotal shaft to be capable of performing a shoveling movement and a dumping movement around the first pivotal shaft, the first pivotal shaft being disposed on a tip portion of the boom;
a boom cylinder to swing the boom;
a bucket cylinder to move the bucket to make the bucket perform the shoveling movement and the dumping movement;
a control valve to be switched to any one of a first state supplying an operation fluid to the bucket cylinder and a second state stopping supplying the operation fluid to the bucket cylinder;
a first movable member to turn around the first pivotal shaft in accordance with the movement of the bucket;
a second movable member connected to the control valve and configured to move to one direction and to the other direction to switch the control valve to the first state and to the second state; and
a wire connecting the first movable member to the second movable member, the wire being arranged passing under the boom.

19. A work machine comprising:
the front loader according to claim 18; and
a vehicle body supporting the front loader.

* * * * *